United States Patent
Ohta

(10) Patent No.: US 10,390,136 B2
(45) Date of Patent: Aug. 20, 2019

(54) HOWLING SUPPRESSION DEVICE AND HOWLING SUPPRESSION METHOD

(71) Applicant: YAMAHA CORPORATION, Hamamatsu-shi (JP)

(72) Inventor: Satoshi Ohta, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 0 days.

(21) Appl. No.: 15/839,062

(22) Filed: Dec. 12, 2017

(65) Prior Publication Data

US 2018/0167731 A1 Jun. 14, 2018

(30) Foreign Application Priority Data

| Dec. 13, 2016 | (JP) | 2016-241110 |
| Mar. 24, 2017 | (JP) | 2017-058917 |
| Oct. 13, 2017 | (JP) | 2017-199529 |

(51) Int. Cl.

| H04R 27/00 | (2006.01) |
| H04R 3/02 | (2006.01) |
| H04R 3/12 | (2006.01) |
| B60R 11/02 | (2006.01) |
| H04B 1/10 | (2006.01) |
| H04R 3/00 | (2006.01) |

(52) U.S. Cl.
CPC ............... *H04R 3/02* (2013.01); *B60R 11/02* (2013.01); *H04R 3/12* (2013.01); *H04B 1/10* (2013.01); *H04R 3/005* (2013.01); *H04R 2430/01* (2013.01); *H04R 2499/13* (2013.01)

(58) Field of Classification Search
CPC ...................................................... H04R 27/00
See application file for complete search history.

(56) References Cited

U.S. PATENT DOCUMENTS

| 10,002,601 | B2* | 6/2018 | Mohammad | G10K 11/178 |
| 2008/0025527 | A1* | 1/2008 | Haulick | H04M 9/082 381/93 |
| 2018/0061392 | A1* | 3/2018 | Oh | G10K 11/178 |

FOREIGN PATENT DOCUMENTS

JP 2012195801 A 10/2012

* cited by examiner

*Primary Examiner* — Olisa Anwah
(74) *Attorney, Agent, or Firm* — Rossi, Kimms & McDowell LLP

(57) ABSTRACT

A howling suppression device includes a first speaker and a second speaker provided in a room, and a sound signal generator configured to supply the first speaker with a first sound signal generated based on an output signal of a microphone, and configured to supply the second speaker with a second sound signal generated so that a part or all of a sound emitted from the first speaker is canceled out at the microphone by a sound emitted from the second speaker based on the output signal of the microphone.

18 Claims, 16 Drawing Sheets

HOWLING SUPPRESSION DEVICE AND HOWLING SUPPRESSION METHOD

CROSS REFERENCE TO RELATED APPLICATIONS

This application is based on Japanese Patent Application (No. 2016-241110) filed on Dec. 13, 2016, Japanese Patent Application (No. 2017-058917) filed on Mar. 24, 2017 and Japanese Patent Application (No. 2017-199529) filed on Oct. 13, 2017, the contents of which are incorporated herein by reference.

BACKGROUND OF THE INVENTION

1. Field of the Invention

The present invention relates to a technique to suppress the occurrence of howling in a room such as a vehicle interior.

2. Description of the Related Art

When the driver and a passenger sitting on a backseat have a conversation while the vehicle is moving, it is sometimes difficult to hear the others' voices because of the influence of the road noise. Accordingly, conversation support devices are known that support conversation by amplifying the sound collected through a microphone and emitting it through a speaker. Moreover, in the conversation support devices, howling can occur if the sound outputted from the speaker is inputted to the microphone. Accordingly, in the conventional conversation support devices, echo cancellation is sometimes used to suppress howling (for example, JP-A-2012-195801).

Since the echo cancellation processing is generally heavy in processing load, in the conventional conversation support device, a certain amount of time elapses from when the utterer makes an utterance to when the utterance is emitted from a speaker. When a delay time occurs like this, the direct sound from the utterer and the delay sound from the speaker are heard by the other in a state of being superimposed one on another. For this reason, the sound is heard by the other as if the conversation took place in a bathroom.

SUMMARY OF THE INVENTION

The present invention is made in view of the above-described circumstances, and a problem to be solved is to suppress howling while making it easy to hear the utterer's voice in a room such as a vehicle interior.

There is provided a howling suppression device according to the present invention comprising:
a first speaker and a second speaker provided in a room; and
a sound signal generator configured to supply the first speaker with a first sound signal generated based on an output signal of a microphone, and configured to supply the second speaker with a second sound signal generated so that a part or all of a sound emitted from the first speaker is canceled out at the microphone by a sound emitted from the second speaker based on the output signal of the microphone.

Also, there is provided a howling suppression method according to the present invention comprising:
supplying a first sound signal generated based on an output signal of a microphone to a first speaker; and
supplying a second sound signal generated so that a part or all of a sound emitted from the first speaker is canceled out at the microphone by a sound emitted from a second speaker to the second speaker.

DETAILED DESCRIPTION OF THE EXEMPLARY EMBODIMENTS

Figure 1:
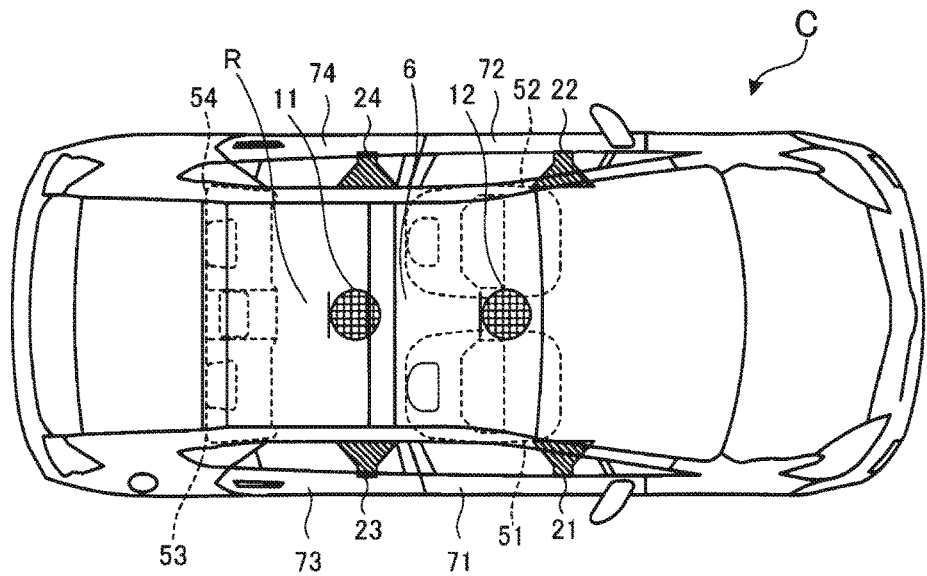
FIG. 1 is a plan view of a vehicle mounted with a howling suppression device according to a first embodiment.

Hereinafter, embodiments according to the present invention will be described with reference to the drawings. In the drawings, the dimensions and scales of the parts are different from the actual ones as appropriate. The embodiments described below are preferred concrete examples of the present invention. For this reason, in the present embodiments, technically preferable various limitations are added. However, the scope of the present invention is not limited to these embodiments as long as there is specifically no reference as to a limitation to the present invention in the following description:

1. First Embodiment

Figure 2:
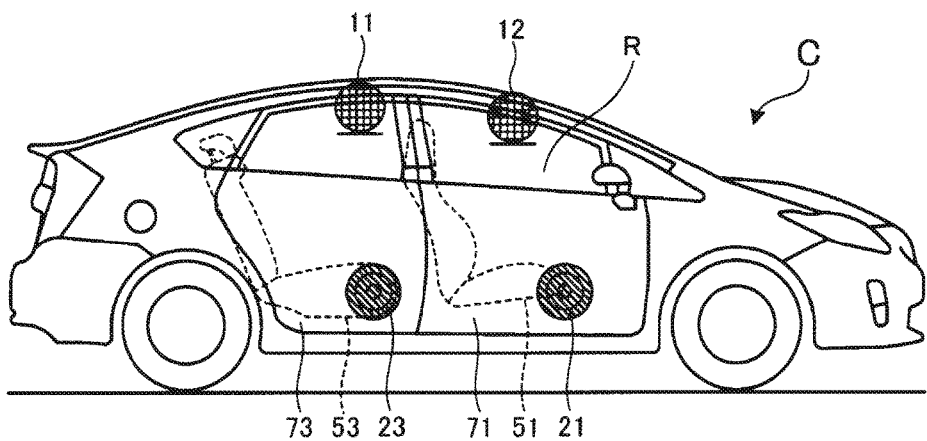
FIG. 2 is a side view of the vehicle.

A howling suppression device 100 according to the present embodiment is used for a vehicle C. FIG. 1 is a plan view of the vehicle C mounted with the howling suppression device 100 according to the first embodiment of the present invention, and FIG. 2 is a side view of the vehicle C.

In a vehicle interior R of the vehicle C, in addition to the howling suppression device 100, rectangularly arranged four seats 51 to 54, a ceiling 6, a front right door 71, a front left door 72, a rear right door 73 and a rear left door 74 are disposed. The seat 51 is the driver seat, the seat 52 is the front passenger seat, the seat 53 is the rear right seat, and the seat 54 is the rear left seat. The seats 51 to 54 are each formed of a member the material of which is cloth or skin. For this reason, the seats 51 to 54 have sound absorbability. The seats 51 to 54 face in a common direction.

The howling suppression device 100 includes a first microphone 11 and a second microphone 12, and a first speaker 21, a second speaker 22, a third speaker 23 and a fourth speaker 24.

The first microphone 11 (mic) which is provided with a first sound collection portion (sound collection portion) that collects sound converts the collected sound to a sound signal and outputs it. The second microphone 12 which is similarly provided with a second sound collection portion converts the collected sound to a sound signal and outputs it. While the first sound collection portion and the second sound collection portion may have any structure that collects sound, for example, a windbreak structure corresponds thereto. The first microphone 11 plays a role in collecting the voices of the utterers sitting on the seat 53 and the seat 54 in the rear. The first microphone 11 is disposed on the ceiling 6 of the vehicle interior R, and is provided, for example, in the neighborhood of the room lamp. On the other hand, the second microphone 12 plays a role in collecting the voices of the utterances sitting on the seat 51 and the seat 52. The second microphone 12 is disposed on the ceiling 6 of the vehicle interior R, and is provided, for example, in the neighborhood of the map lamp.

In the example shown in FIG. 1, the first microphone 11 is disposed so that the distance from the first speaker 21 to the first microphone 11 and the distance from the second speaker 22 to the first microphone 11 are substantially equal to each other. Moreover, the first microphone 11 is disposed so that the distance from the third speaker 23 to the first microphone 11 and the distance from the fourth speaker 24 to the first microphone 11 are substantially equal to each other. Further, the second microphone 12 is disposed so that the distance from the first speaker 21 to the second microphone 12 and the distance from the second speaker 22 to the second microphone 12 are substantially equal to each other, and in addition, is disposed so that the distance from the third speaker 23 to the second microphone 12 and the distance from the fourth speaker 24 to the second microphone 12 are substantially equal to each other. It is preferable that the distance from a microphone to one speaker be within a range of 70% to 130% of the distance from the microphone to the other speaker.

Figure 3:
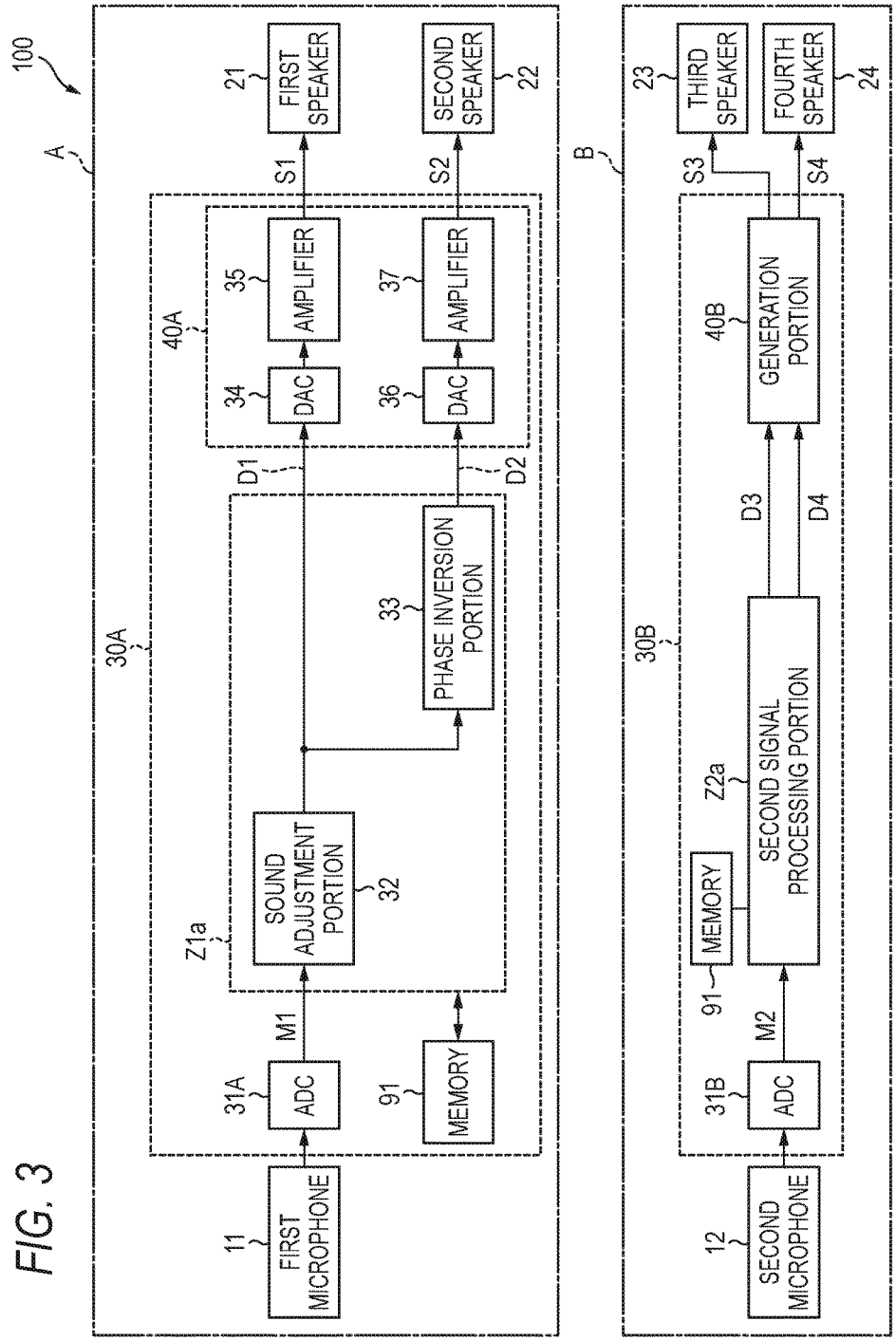
FIG. 3 is a block diagram showing the electric structure of the howling suppression device.

FIG. 3 is a block diagram showing the electric structure of the howling suppression device 100. The howling suppression device 100 is provided with a first processing portion A that makes it easy for the utterance at the seat 53 and the seat 54 in the rear to be heard at the seat 51 and the seat 52 in the front and a second processing portion B that makes it easy for the utterance at the seat 51 and the seat 52 in the front to be heard at the seat 53 and the seat 54 in the rear.

The first processing portion A is provided with the first microphone 11, a first sound signal generation portion 30A, the first speaker 21 and the second speaker 22. The second processing portion B is provided with the second microphone 12, a second sound signal generation portion 30B, the third speaker 23 and the fourth speaker 24. The structures of the first sound signal generation portion 30A and the second sound signal generation portion 30B are the same. While the first processing portion A will be described in the following, the second processing portion B has a similar structure to the first processing portion A.

The first sound signal generation portion 30A is provided with an AD converter (hereinafter, referred to as ADC) 31A that converts the signal outputted from the first microphone 11 from an analog signal to a digital signal and outputs it as a first input sound signal M1 (input sound signal), a first signal processing portion Z1$a$, and a generation portion 40A that generates a first sound signal S1 driving the first speaker 21 and a second sound signal S2 driving the second speaker 22.

The first signal processing portion Z1$a$ is provided with a sound adjustment portion 32 that performs sound adjustment on the first input sound signal M1 outputted from the ADC 31A to generate a first signal D1. The sound adjustment portion 32 executes, for example, the processing of adjusting at least one of the frequency characteristic and the level of the first input sound signal M1.

Moreover, the first signal processing portion Z1$a$ is provided with a phase inversion portion 33 that inverts the first signal D1. The phase inversion portion 33 generates a second signal D2 which is the first signal D1 the level of which is inverted with the center level of the first signal D1 as the reference. At the second sound signal generation portion 30B, a second input sound signal M2 obtained by AD-converting the output signal of the second microphone 12 is supplied to a second signal processing portion Z2$a$. The second signal processing portion Z2$a$ processes the second input sound signal M2 to generate a third signal D3 and a fourth signal D4 having a phase opposite to the third signal D3.

The functions of the sound adjustment portion 32 and the phase inversion portion 33 are implemented by a processor such as a CPU (central processing unit) or a DSP (digital signal processor) executing predetermined programs stored in a memory 91. Here, the memory 91 is, for example, a recording medium of a given known form such as a semiconductor recording medium, a magnetic recording medium or an optical recording medium, or a recording medium which is a combination of these recording media. In the present specification, a "non-transitory" recording medium includes all the computer-readable recording media other than recording media such as a transmission line that temporarily stores a transitory propagating signal, and does not exclude a volatile memory.

The first signal D1 is converted from a digital signal to an analog signal by a DA converter (hereinafter, referred to as DAC) 34, amplified by an amplifier 35, and then, supplied to the first speaker 21 as the first sound signal S1. On the other hand, the second signal D2 is converted from a digital signal to an analog signal by a DAC 36, amplified by an amplifier 37, and then, supplied to the second speaker 22 as the second sound signal S2. Since the second signal D2 is the first signal D1 that is inverted, the phases of the sound emitted from the first speaker 21 and the sound emitted from the second speaker 22 are in a relation such that one is a normal phase and the other is a reverse phase.

Then, at the second processing portion B, the second microphone 12 outputs the second input sound signal M2 to the second sound signal generation portion 30B. The second sound signal generation portion 30B is structured similarly to the first sound signal generation portion 30A, and is provided with an ADC 31B, the second signal processing portion Z2a, a generation portion 40B and the memory 91. The memory 91 may be shared with the first sound signal generation portion 30A. The second signal processing portion Z2a generates the third signal D3 and the fourth signal D4 which is the third signal D3 that is inverted. The generation portion 40B generates a third sound signal S3 of the normal phase based on the third signal D3, and outputs it to the third speaker 23. Moreover, the generation portion 40B generates a fourth sound signal S4 of the reverse phase based on the fourth signal D4, and outputs it to the fourth speaker 24. The generation portion 40B is structured similarly to the generation portion 40A.

Figure 4:
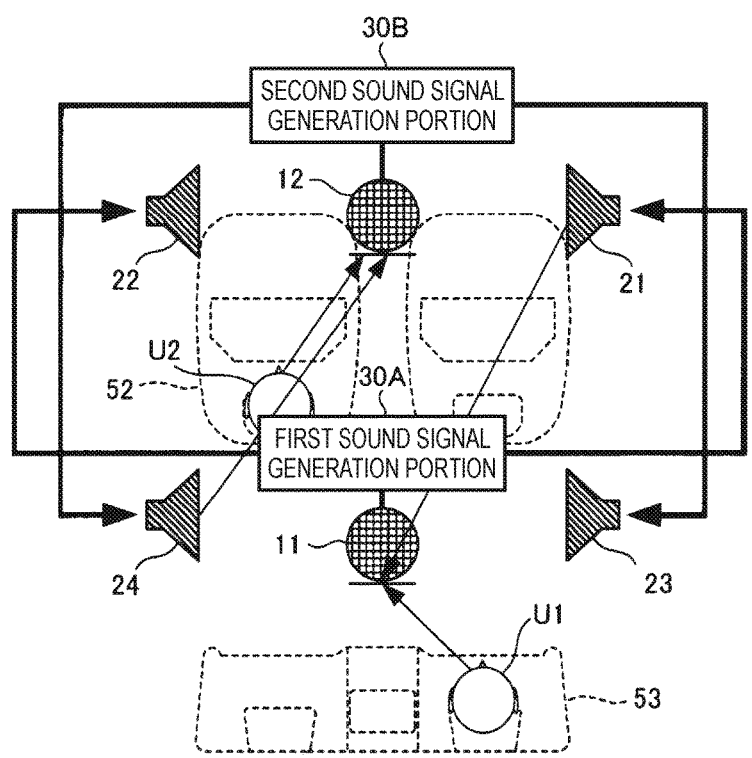
FIG. 4 is a view for explaining the function of the howling suppression device in a conversation.

Now, a case will be assumed in which a user U1 who is sitting on the seat 53 and a user U2 who is sitting on the seat 52 as shown in FIG. 4 have a conversation. First, after the voice of the user U1 is collected by the first microphone 11 and processed by the first sound signal generation portion 30A, a sound of the normal phase is emitted from the first speaker 21, and a sound of the reverse phase is emitted from the second speaker 22.

Figure 5:
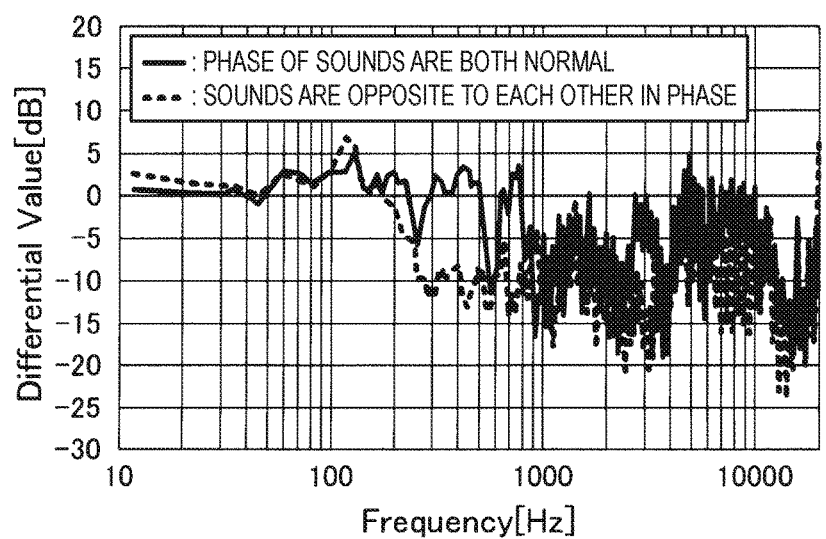
FIG. 5 is a graph showing the difference in frequency characteristic between the original sound and the re-collected sound when the sound collected by a first microphone is emitted from a first speaker and a second speaker in normal and reverse phases and collected by the first microphone again.

When the sound collected by the first microphone 11 is "X" and the sound which is the sound X emitted from the first speaker 21 and the second speaker 22 and returning to the first microphone 11 to be collected again is "X'", the solid line shown in FIG. 5 indicates the difference in frequency characteristic between the sound X and the sound X' when the sounds emitted from the first speaker 21 and the second speaker 22 are both sounds of the normal phase. On the other hand, the dotted line shown in FIG. 5 indicates the difference in frequency characteristic between the sound X and the sound X' when a sound of the normal phase is emitted from the first speaker 21 and a sound of the reverse phase is emitted from the second speaker 22. When the difference in frequency characteristic shown in FIG. 5 is a positive value, the gain of the path from the first microphone 11, the first sound signal generation portion 30A, the first speaker 21, the second speaker 22 to the first microphone 11 exceeds "1", which results in amplification. As is apparent from the figure, it is understood that no amplification path occurs over a wide band when the sound of the normal phase is emitted from the first speaker 21 and the sound of the reverse phase is emitted from the second speaker 22 compared with when the sound of the normal phase is emitted from the first speaker 21 and the second speaker 22. The sound of the normal phase emitted from the first speaker 21 and the sound of the reverse phase emitted from the second speaker 22 cancel out each other in the neighborhood of the first microphone 11, whereby howling is suppressed.

That is, the first sound signal generation portion 30A supplies the first speaker 21 with the first sound signal S1 generated based on the output signal of the first microphone 11, and supplies the second speaker 22 with the second sound signal S2 generated so that part or all of the sound emitted from the first speaker 21 is canceled out at the first microphone 11 by the sound emitted from the second speaker 22, based on the output signal of the first microphone 11.

Then, after the voice of the user U2 is collected by the second microphone 12 and processed by the second sound signal generation portion 30B, a sound of the normal phase is emitted from the third speaker 23, and a sound of the reverse phase is emitted from the fourth speaker 24.

Figure 6:
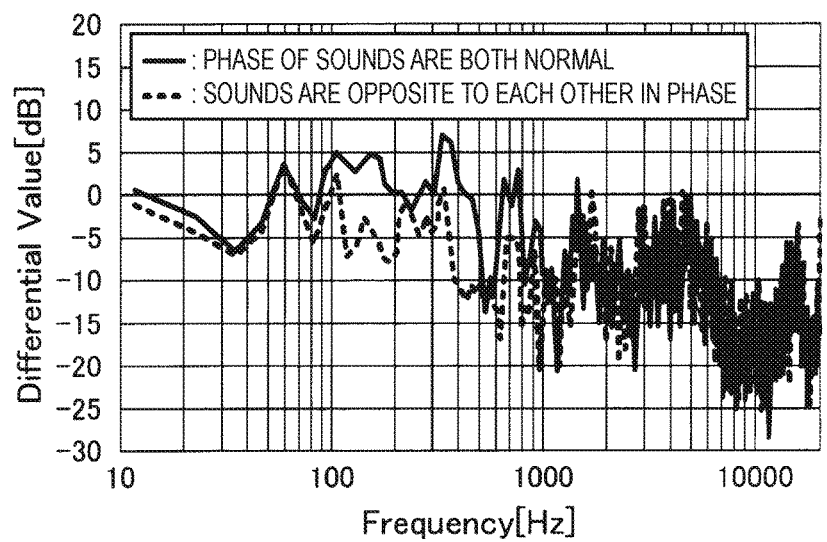
FIG. 6 is a graph showing the difference in frequency characteristic between the original sound and the re-collected sound when the sound collected by a second microphone is emitted from a third speaker and a fourth speaker in normal and reverse phases and collected by the second microphone again.

When the sound collected by the second microphone 12 is "Y" and the sound which is the sound Y emitted from the third speaker 23 and the fourth speaker 24 and returning to the second microphone 12 to be collected again is "Y'", the solid line shown in FIG. 6 indicates the difference in frequency characteristic between the sound Y and the sound Y' when the phases of the sounds emitted from the third speaker 23 and the fourth speaker 24 are both sounds of the normal phase. On the other hand, the dotted line shown in FIG. 6 indicates the difference in frequency characteristic between the sound Y and the sound Y' when a sound of the normal phase is emitted from the third speaker 23 and a sound of the reverse phase is emitted from the fourth speaker 24. When the difference in frequency characteristic shown in FIG. 6 is a positive value, the gain of the path from the second microphone 12, the second sound signal generation portion 30B, the third speaker 23, the fourth speaker 24 to the second microphone 12 exceeds "1", which results in amplification. As is apparent from the figure, it is understood that no amplification path occurs over a wide band when the sound of the normal phase is emitted from the third speaker 23 and the sound of the reverse phase is emitted from the fourth speaker 24 compared with when the sound of the normal phase is emitted from the third speaker 23 and the fourth speaker 24. The sound of the normal phase emitted from the third speaker 23 and the sound of the reverse phase emitted from the fourth speaker 24 cancel out each other in the neighborhood of the second microphone 12, whereby howling is suppressed.

Howling occurs because the sounds emitted from the first speaker 21 and the second speaker 22 are collected by the first microphone 11 and positively fed back. Although it is considered to reduce the gain in order to suppress howling, if the gain is reduced, for example, it makes it difficult for the driver to hear the words spoken by the speaker at a rear seat.

In the present embodiment, the first microphone 11 is disposed so that the distance from the first speaker 21 to the first microphone 11 and the distance from the second speaker 22 to the first microphone 11 are substantially equal to each other. Moreover, since the sounds of the normal phase and the reverse phase are emitted from the first speaker 21 and the second speaker 22, the sound from the first speaker 21 and the sound from the second speaker 22 are canceled out in the neighborhood of the first microphone 11. For this reason, howling can be suppressed without the gain of the first sound signal generation portion 30A being reduced.

Further, the first microphone 11 also collects the sound from the third speaker 23 and the sound from the fourth speaker 24, and causes them to be emitted from the first speaker 21 and the second speaker 22. In the present embodiment, the distance from the first microphone 11 to the third speaker 23 and the distance from the first microphone 11 to the fourth speaker 24 are substantially equal to each other. Moreover, since the sounds of the normal phase and the reverse phase are emitted from the third speaker 23 and the fourth speaker 24, the sound from the third speaker 23 and the sound from the fourth speaker 24 are canceled out in the neighborhood of the first microphone 11. For this reason, howling can be suppressed without the gain of the second sound signal generation portion 30B being reduced.

In other words, the time from when the first input sound signal M1 is outputted from the first microphone 11 to when the sound emitted from the first speaker 21 based on the first input sound signal M1 reaches the first microphone 11 is substantially equal to the time from when the first input sound signal M1 is outputted from the first microphone 11 to when the sound emitted from the second speaker 22 based on the first input sound signal M1 reaches the first microphone 11. Since the phases of the first sound signal S1 and the second sound signal S2 are in the relation such that one is the normal phase and the other is the reverse phase, the sound emitted by the first speaker 21 and the sound emitted by the second speaker 22 can cancel out each other in the neighborhood of the first microphone 11.

As described above, according to the present embodiment, since the sound of the normal phase is canceled out by the sound of the reverse phase before the sound is inputted to the first microphone 11 and the second microphone 12, howling can be suppressed.

Moreover, since the first sound signal generation portion 30A generates the first sound signal S1 of the normal phase and the second sound signal S2 of the reverse phase only by being provided with the phase inversion portion 33 that inverts the first signal D1, the structure can be significantly simplified compared with the conventional device having the echo cancellation function. Further, since there is hardly any delay time, a clear and easy-to-hear sound can be emitted.

2. Second Embodiment

Figure 7:
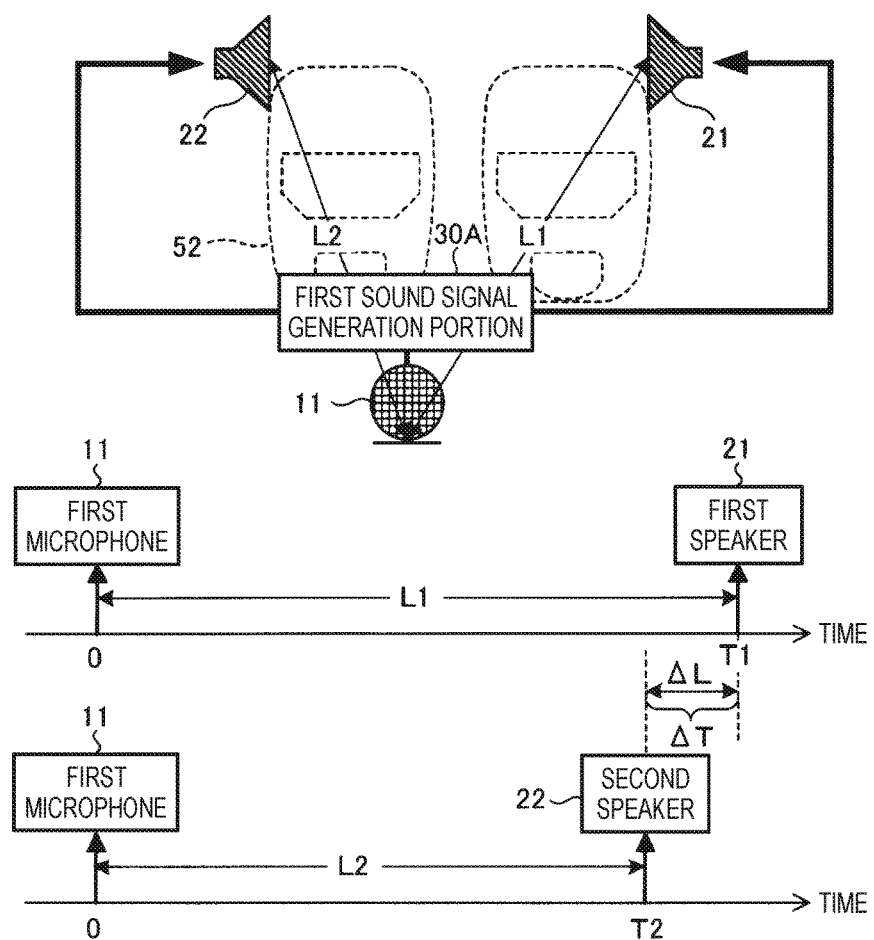
FIG. 7 is an explanatory view for explaining a differential time when the distance between the first microphone and the first speaker and the distance between the first microphone and the second speaker are different.

In the above-described embodiment, the distance from the first speaker 21 to the first microphone 11 and the distance from the second speaker 22 to the first microphone 11 are made substantially equal to each other, and the distance from the third speaker 23 to the second microphone 12 and the distance from the fourth speaker 24 to the second microphone 12 are made substantially equal to each other. However, there can be cases where the first microphone 11 and the second microphone 12 cannot be disposed in such positions because of the structure of the vehicle C. An example thereof is a case where the distance L1 from the first speaker 21 to the first microphone 11 is longer than the distance L2 from the second speaker 22 to the first microphone 11 by a differential distance ΔL as shown in FIG. 7. In this case, the time T1 from when the sound is emitted from the first speaker 21 to when it reaches the first microphone 11 is longer than the time T2 from when the sound is emitted from the second speaker 22 to when it reaches the first microphone 11 by a differential time ΔT.

A howling suppression device 200 according to a second embodiment adjusts the first sound signal S1 supplied to the first speaker 21 and the second sound signal S2 supplied to the second speaker 22 so that the phases of the sound emitted from the second speaker 22 and the sound emitted from the first speaker 21 are in the relation such that one is the normal phase and the other is the reverse phase at the point of time when they reach the first microphone 11.

Figure 8:
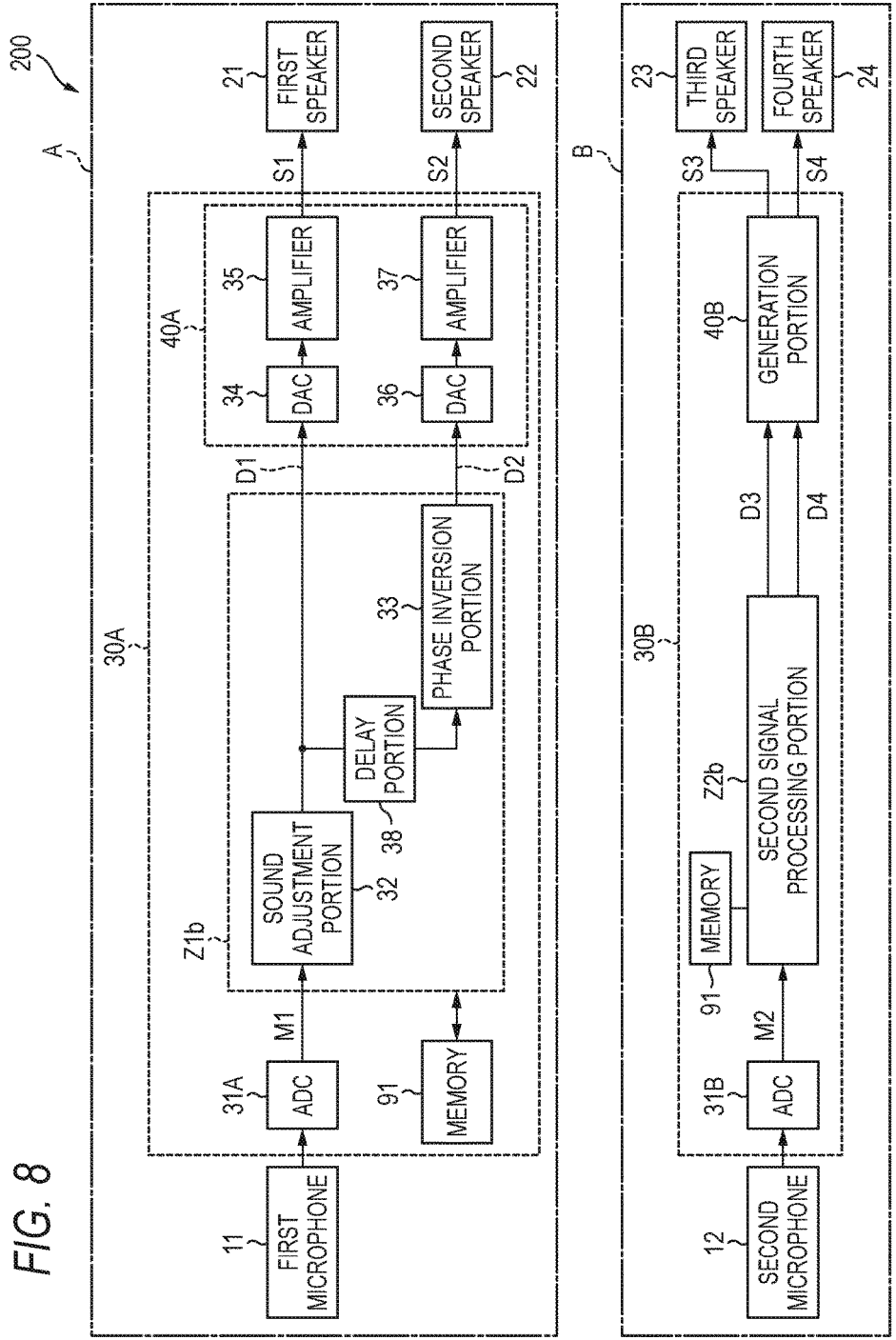
FIG. 8 is a block diagram showing an example of the structure of a howling suppression device according to a second embodiment.

FIG. 8 shows a block diagram of the howling suppression device 200 according to the second embodiment. The howling suppression device 200 of the second embodiment is different from the howling suppression device 100 of the first embodiment shown in FIG. 3 in that a delay portion 38 is provided in a first signal processing portion Z1b. This delay portion 38 delays the first signal D1 by the differential time ΔT, and supplies it to the phase inversion portion 33. The delay portion 38 is formed of, for example, a memory. The delay portion 38 may be provided between the phase inversion portion 33 and the DAC 36. Further, the delay portion 38 may be formed of an analog circuit and provided in front of or behind the amplifier 37.

The second sound signal S2 of the reverse phase is supplied to the second speaker 22 while being delayed from the first sound signal S1 of the normal phase by the differential time ΔT by the delay portion 38. For this reason, the sound emitted from the second speaker 22 is delayed by the differential time ΔT from the sound emitted from the first speaker 21. As a consequence, the phases of the sound emitted from the second speaker 22 and the sound emitted from the first speaker 21 are in the relation such that one is the normal phase and the other is the reverse phase at the point of time when they reach the first microphone 11. Thereby, the sound from the first speaker 21 and the sound from the second speaker 22 are canceled out in the neighborhood of the first microphone 11. For this reason, howling can be suppressed.

In other words, the first sound signal S1 generated based on the first input sound signal M1 is supplied to the first speaker 21, and a sound is emitted from the first speaker 21. The time from when the sound signal M1 is outputted from the first microphone 11 to when the sound emitted from the first speaker 21 reaches the first microphone 11 is substantially equal to the time from when the sound signal M1 is outputted from the first microphone 11 to when the sound emitted by the second speaker 22 reaches the first microphone 11. Since the phases of the first sound signal S1 and the second sound signal S2 are in the relation such that one is the normal phase and the other is the reverse phase, the sound emitted by the first speaker 21 and the sound emitted by the second speaker 22 can be canceled out in the neighborhood of the first microphone 11. A second signal processing portion Z2b is structured similarly to the first signal processing portion Z1b, and is provided with the delay portion 38.

Figure 9:
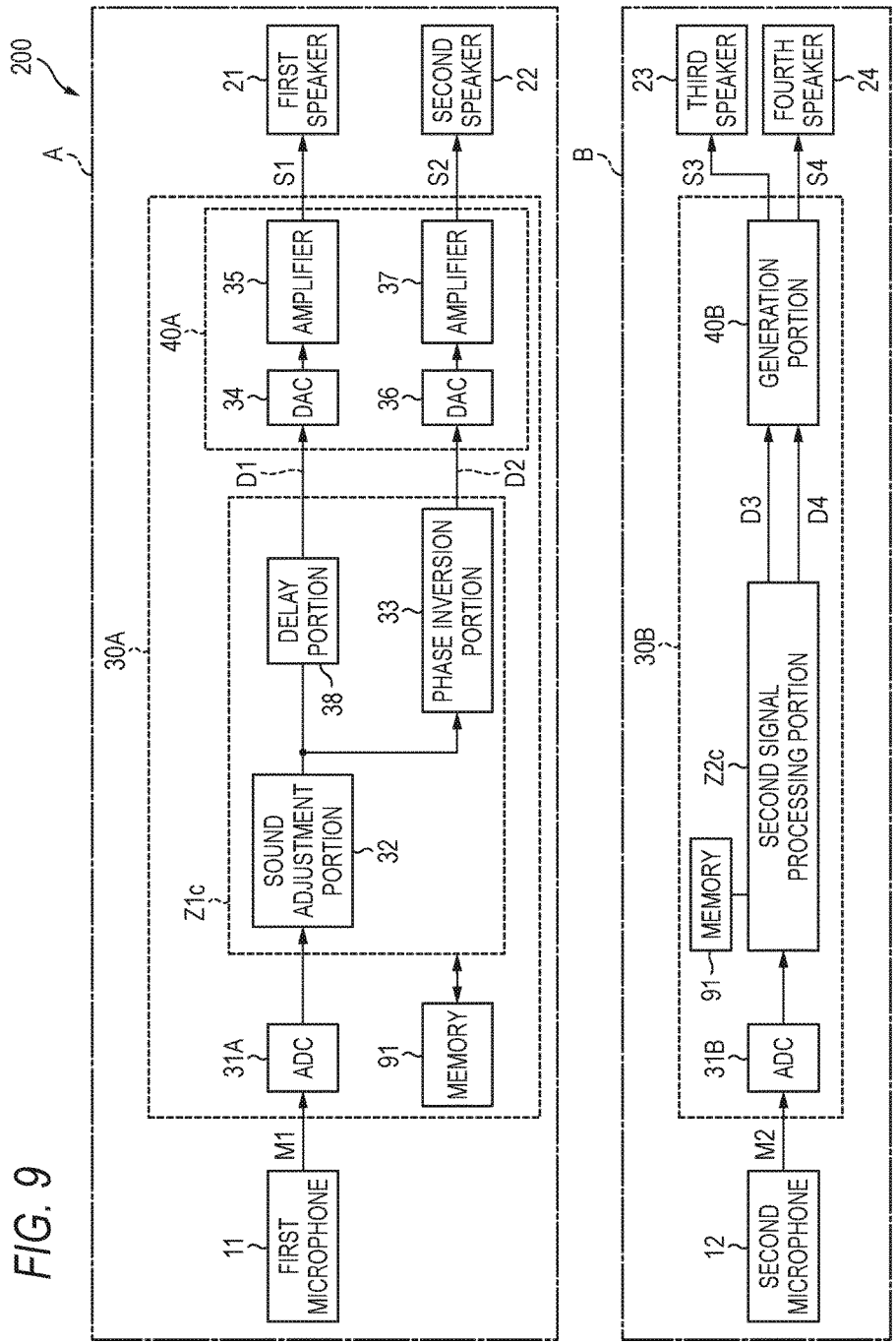
FIG. 9 is a block diagram showing another example of the structure of the howling suppression device according to the second embodiment.

While a case where the distance L1 from the first speaker 21 to the first microphone 11 is longer than the distance L2 from the second speaker 22 to the first microphone 11 by the differential distance ΔL is assumed in the second embodiment, a case where the distance L2 is, conversely, longer than the distance L1 by the differential distance ΔL is assumed. In this case, the time T2 from when the sound is emitted from the second speaker 22 to when it reaches the first microphone 11 is longer than the time T1 from when the sound is emitted from the first speaker 21 to when it reaches the first microphone 11 by the differential time ΔT. In this case, a first signal processing portion Z1c is structured as shown in FIG. 9. That is, the delay portion 38 is provided between the sound adjustment portion 32 and the DAC 34. Thereby, the first sound signal generation portion 30A delays the time from when the first input sound signal M1 is inputted to when the first sound signal S1 is outputted by the differential time ΔT compared with the time from when the first input sound signal M1 is inputted to when the second sound signal S2 is outputted. Thereby, the sound emitted by the first speaker 21 and the sound emitted by the second speaker 22 can be canceled out in the neighborhood of the first microphone 11. A second signal processing portion Z2c is also structured similarly to the first signal processing portion Z1c.

3. Third Embodiment

In the above-described first embodiment and second embodiment, the first sound signal S1 of the normal phase and the second sound signal S2 of the reverse phase are generated, and adjustment is made so that the sounds are canceled out in the neighborhood of the microphone. In an environment where the running noise is large, it is necessary to increase the volume of the sounds emitted from the speakers 21 to 24 in order that the assist sound to assist conversation is not buried in the running noise. The running noise includes the engine sound and the road noise which are sounds resulting from the running of the vehicle, and environmental sounds.

According to the methods of the above-described first embodiment and second embodiment, the gain increase is limited, and howling can occur if the sound volume is increased.

On the other hand, according to a general echo cancellation method, although the gain can be increased, the assist sounds emitted from the speakers 21 to 24 are delayed from the speaker's voice (direct sound) because of a delay incident to the processing time of the echo cancellation processing, so that the voice is heard as if echo were added thereto.

However, in an environment where the running noise is large, the direct sound from the speaker is buried in the running noise and becomes hard to hear.

Accordingly, in a howling suppression device 300 according to the third embodiment, howling is suppressed over a wide range from a small running noise environment to a large running noise environment by switching the howling suppression method according to the magnitude of the running noise.

Figure 10:
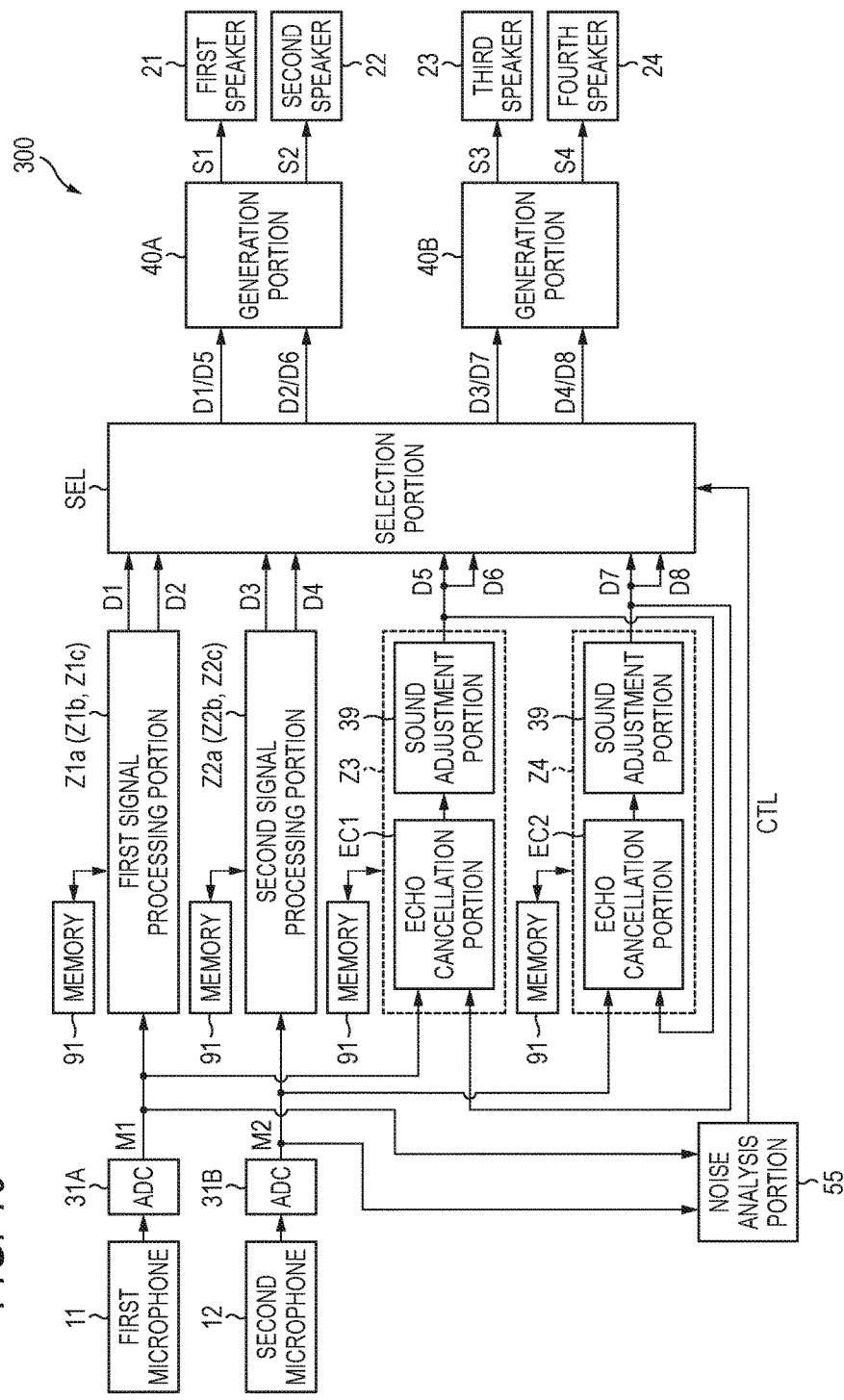
FIG. 10 is a block diagram showing an example of the structure of a howling suppression device according to a third embodiment.

FIG. 10 is a block diagram showing the structure of the howling suppression device 300 according to the third embodiment. As shown in this figure, the howling suppression device 300 is structured similarly to the howling suppression device 100 of the first embodiment except that the following are provided: a third signal processing portion Z3 that outputs a fifth signal D5 and a sixth signal D6; a fourth signal processing portion Z4 that outputs a seventh signal D7 and an eighth signal D8; a noise analysis portion 55; and a selection portion SEL supplied with the first to eighth signals D1 to D8. Like the first signal processing portion Z1a and the second signal processing portion Z2a, the third signal processing portion Z3, the fourth signal processing portion Z4, the noise analysis portion 55 and the selection portion SEL are implemented by a processor such as a CPU or a DSP executing programs stored in the memory 91.

The third signal processing portion Z3 is provided with an echo cancellation portion EC1 and a sound adjustment portion 39, and the fourth signal processing portion Z4 is provided with an echo cancellation portion EC2 and a sound adjustment portion 39. To the echo cancellation portion EC1, the first input sound signal M1 and the seventh signal D7 are inputted, and to the echo cancellation portion EC2, the second input sound signal M2 and the fifth signal D5 are inputted. The echo cancellation portions EC1 and EC2 execute echo cancellation processing. The sound adjustment portion 39 provided in the third signal processing portion Z3 and the fourth signal processing portion Z4 adjusts the sound quality by varying the frequency characteristic and the gain.

The echo cancellation portion EC1 executes, on the first input sound signal M1, the processing of reducing the component contained in the seventh signal D7, and generates the fifth signal D5 and the sixth signal D6. The echo cancellation portion EC2 executes, on the second input sound signal M2, the processing of reducing the component contained in the fifth signal D5, and generates the seventh signal D7 and the eighth signal D8.

For example, in the example shown in FIG. 4, the utterance of the user U1 is fed back on the path from the user U1, the first microphone 11, the first sound signal generation portion 30A, the first speaker 21 and the second speaker 22, the second microphone 12, the second sound signal generation portion 30B, the third speaker 23 and the fourth speaker 24 to the first microphone 11. Oscillation occurs when the gain of this path exceeds "1".

In the processing executed at the echo cancellation portion EC1, the components of, of the sounds collected by the first microphone 11 provided on the rear seat side, the sounds emitted from the third speaker 23 and the fourth speaker 24 provided on the rear seat side are canceled out to generate the sounds emitted from the first speaker 21 and the second speaker 22. That is, when the line to transmit the voice of the user at a rear seat to the user at a front seat is a first line and a line to transmit the voice of the user at a front seat to the user at a rear seat is a second line, the interference between the first line and the second lines is reduced. In this regard, the processing executed by the echo cancellation portion EC2 is similar.

Consequently, the amplitudes of the fifth signal D5 and the sixth signal D6 generated at the third signal processing portion Z3 and the seventh signal D7 and the eighth signal D8 generated at the fourth signal processing portion Z4 can be increased.

The noise analysis portion 55 analyzes the magnitude of the running noise based on the first input sound signal M1 and the second input sound signal M2, and generates a control signal CTL indicative of whether the magnitude of the running noise is less than a threshold value or not less than the threshold value. Here, it is preferable to set the threshold value to a degree that the user's direct sound is buried in the running noise.

Then, when the running noise is less than the threshold value, the selection portion SEL outputs the first signal D1, the second signal D2, the third signal D3 and the fourth signal D4, and when the running noise is not less than the threshold value, the selection portion SEL outputs the fifth signal D5, the sixth signal D6, the seventh signal D7 and the eighth signal D8.

The generation portion 40A generates the first sound signal S1 and the second sound signal S2 based on the first signal D1 and the second signal D2, or the fifth signal D5 and the sixth signal D6. The generation portion 40B generates the third sound signal S3 and the fourth sound signal S4 based on the third signal D3 and the fourth signal D4, or the seventh signal D7 and the eighth signal D8.

In the howling suppression device 300, when the running noise is small (less than the threshold value), the first sound signal S1 generated based on the output signal of the first microphone 11 is supplied to the first speaker 21, and generates the second sound signal S2 so that part or all of the sound emitted from the first speaker 21 is canceled out at the first microphone 11 by the sound emitted from the second speaker 22, based on the output signal of the first microphone 11. The second sound signal S2 is supplied to the second speaker 22. On the other hand, when the running noise is large (not less than the threshold value), the echo cancellation processing is performed on the output signal of the first microphone 11 to generate the first sound signal S1 and the second sound signal S2, the first sound signal S1 is supplied to the first speaker 21, and the second sound signal S2 is supplied to the second speaker 22. As described above, the howling suppression device 300 can switch the howling suppression method according to the magnitude of the running noise.

According to the howling suppression device 300, when the running noise is small, a high quality assist sound with a small echo effect can be reproduced. Further, when the running noise is not less than the threshold value, since the assist sound obtained by the echo cancellation processing can be reproduced, the assist sound can be reproduced at a volume that is not buried in the running noise. In addition, since the echo cancellation processing requires a processing time, the assist sound is reproduced with delay from the direct sound. However, since the direct sound is buried in the running noise when the running noise is large, it is difficult for the user to hear the direct sound even though the echo cancellation processing is executed, so that uncomfortableness due to the echo effect is reduced. Consequently, the howling suppression device 300 is capable of suppressing howling over a wide range from a small running noise environment to a large running noise environment by switching the howling suppression method according to the running noise.

In the present embodiment, the first signal processing portion Z1a, the third signal processing portion Z3, the selection portion SEL and the generation portion 40A may be regarded as the first sound signal generation portion 30A that generates the first sound signal S1 and the second sound signal S2 based on the first input sound signal M1, and the second signal processing portion Z2a, the fourth signal processing portion Z4, the selection portion SEL and the generation portion 40B may be regarded as the second sound signal generation portion 30B that generates the third sound signal S3 and the fourth sound signal S4 based on the second input sound signal M2. In this case, when the running noise is small, the first sound signal generation portion 30A processes the first input sound signal M1 to generate the first signal D1, generates the first sound signal S1 based on the first signal D1 and generates the second sound signal S2 based on the second signal D2 which is the first signal D1 that is inverted, and when the running noise is large, the first sound signal generation portion 30A generates the first sound signal S1 and the second sound signal S2 based on a signal which is the first input sound signal M1 having undergone the echo cancellation processing. When the running noise is small, the second sound signal generation portion 30B processes the second input sound signal M2 to generate the third signal D3, generates the third sound signal S3 based on the third signal D3 and generates the fourth sound signal S4 based on the fourth signal D4 which is the third signal D3 that is inverted, and when the running noise is large, the second sound signal generation portion 30B generates the first sound signal S1 and the second sound signal S2 based on a signal which is the second input sound signal M2 having undergone the echo cancellation processing.

4. Fourth Embodiment

The space where the sound emitted from the first speaker 21 passes before collected by the first microphone 11 (hereinafter, referred to as "first space") is different from the space where the sound emitted from the second speaker 22 passes before collected by the first microphone 11 (hereinafter, referred to as "second space"). In each of the first space and the second space, baggage is put or a user is situated. For this reason, there can be a possibility that the transfer function Hfr of the first space and the transfer function Hfl of the second space are different from each other.

When the transfer function Hfr is different from the transfer function Hfl, even if the first signal D1 and the second signal D2 are opposite to each other in phase, the sound emitted by the first speaker 21 and the sound emitted by the second speaker 22 are not opposite to each other in phase in the neighborhood of the first microphone 11, so that it is difficult for them to cancel out each other.

In a howling suppression device 400 according to a fourth embodiment, the first sound signal and the second sound signal are generated in order that the sound emitted by the first speaker 21 and the sound emitted by the second speaker 22 are easily canceled out by each other in the neighborhood of the first microphone 11 even when the transfer function Hfr is different from the transfer function Hfl.

Figure 11:
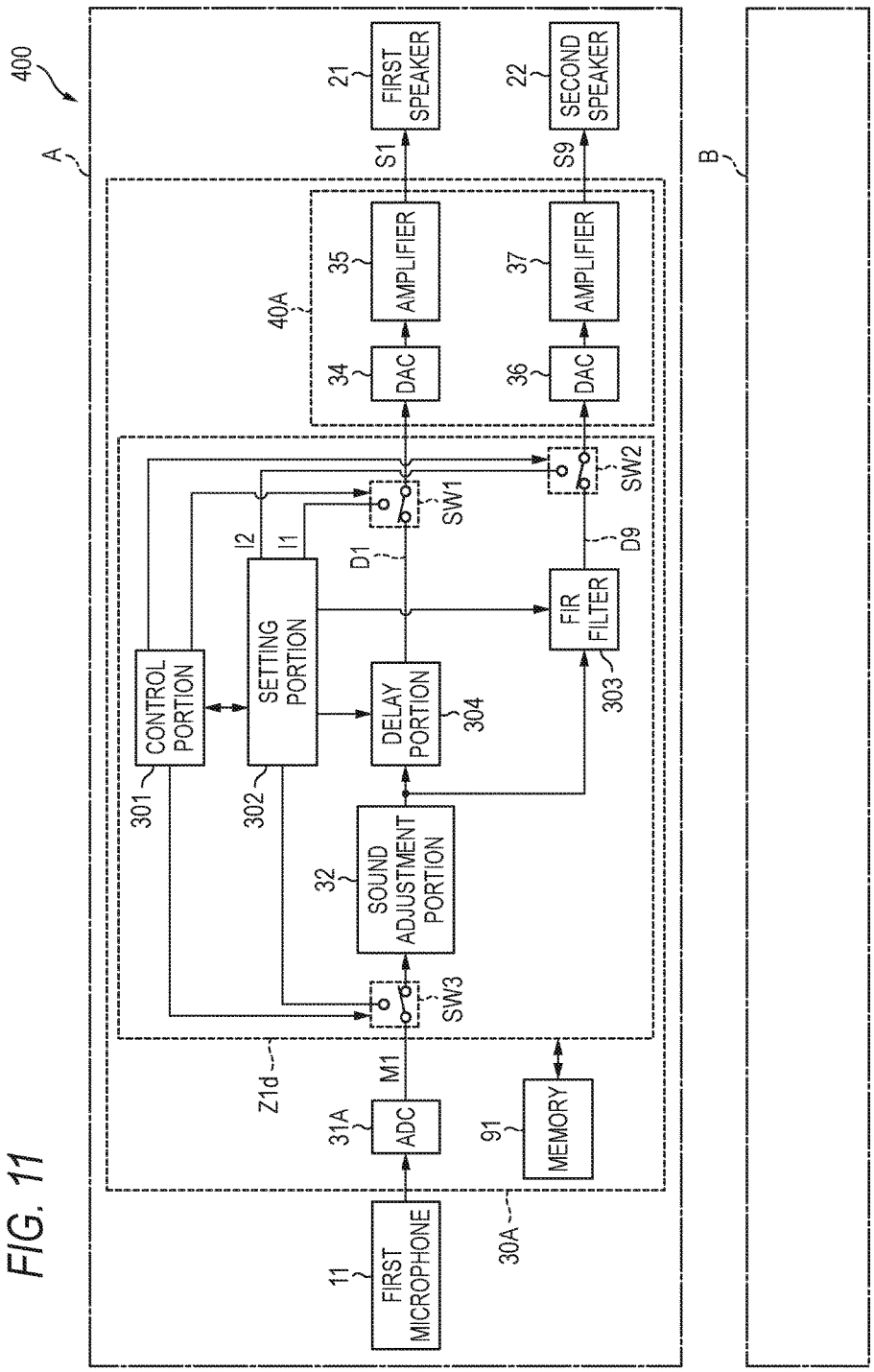
FIG. 11 is a block diagram showing an example of the structure of a howling suppression device according to a fourth embodiment.

FIG. 11 is a block diagram of the howling suppression device 400 according to the fourth embodiment.

The howling suppression device 400 of the fourth embodiment is different from the howling suppression device 100 of the first embodiment shown in FIG. 3 in that in a first signal processing portion Z1d, the phase inversion portion 33 is omitted and a control portion 301, a setting portion 302, an FIR filter 303, a delay portion 304 and changeover switches SW1 to SW3 are provided.

In the fourth embodiment, as in the first embodiment, the distance from the first speaker 21 to the first microphone 11 and the distance from the second speaker 22 to the first microphone 11 are substantially equal to each other, and the distance from the third speaker 23 to the second microphone 12 and the distance from the fourth speaker 24 to the second microphone 12 are substantially equal to each other.

The changeover switch SW1 alternatively supplies the signal outputted by the delay portion 304 and an impulse signal I1 outputted by the setting portion 302 to the DAC 34. The changeover switch SW2 alternatively supplies the signal outputted by the FIR filter 303 and an impulse signal I2 outputted by the setting portion 302 to the DAC 36. The changeover switch SW3 alternatively supplies the signal outputted by the ADC 31A to the setting portion 302 and the sound adjustment portion 32.

The control portion 301 controls the changeover switches SW1 to SW3 and the setting portion 302.

In response to the power-on of the howling suppression device 400, the control portion 301 controls the changeover switch SW1 to connect the setting portion 302 and the DAC 34, controls the changeover switch SW2 to connect the setting portion 302 and the DAC 36, and controls the changeover switch SW3 to connect the ADC 31A and the setting portion 302. When completing the control of the changeover switches SW1 to SW3, the control portion 301 outputs an operation start notification to the setting portion 302. The control portion 301 may control the changeover switches SW1 to SW3 and output the operation start notification to the setting portion 302 as described above in response to an operation of a non-illustrated setting button.

The setting portion 302 estimates the transfer function Hfr and the transfer function Hfl in response to the reception of the operation start notification. The setting portion 302 sets the filter coefficient of the FIR filter 303 by using the result of estimation of the transfer function Hfr and the transfer function Hfl, and sets the delay amount (delay time) at the delay portion 304.

Receiving the operation start notification, the setting portion 302 outputs the impulse signal I1 to the switch SW1. The impulse signal I1 is supplied to the first speaker 21 through the switch SW1 and the generation portion 40A. The first speaker 21 emits a first impulse sound responsive to the impulse signal I1. The first impulse sound passes through the first space to be collected by the first microphone 11. The waveform of the first impulse sound is deformed according to the transfer function Hfr of the first space while passing through the first space.

The first microphone 11 outputs a sound signal responsive to the first impulse sound. The setting portion 302 receives the sound signal responsive to the first impulse sound as the impulse response related to the first space through the ADC 31A and the switch SW3. The setting portion 302 analyzes the impulse response related to the first space and calculates the transfer function Hfr.

Then, the setting portion 302 outputs the impulse signal I2 to the switch SW2. The impulse signal I2 is inputted to the second speaker 22 through the switch SW2 and the generation portion 40A. The second speaker 22 emits a second impulse sound responsive to the impulse signal I2. The second impulse sound passes through the second space to be collected by the first microphone 11. The waveform of the second impulse sound is deformed according to the transfer function Hfl of the second space while passing through the second space.

The first microphone 11 outputs a sound signal responsive to the second impulse sound. The setting portion 302 receives the sound signal responsive to the second impulse sound as the impulse response related to the second space through the ADC 31A and the switch SW3. The setting portion 302 analyzes the impulse response related to the second space and calculates the transfer function Hfl.

The setting portion 302 sets a coefficient H1 identified by −(transfer function Hfr/transfer function Hfl) as the filer coefficient of the FIR filter 303. Transfer function Hfr/transfer function Hfl is a value calculated by dividing the transfer function of the space from the first speaker 21 to the first microphone 11 by the transfer function of the space from the second speaker 22 to the first microphone 11.

Then, the setting portion 302 determines the time required for the filter processing at the FIR filter 303 (hereinafter, referred to as "filter processing time") based on the filter coefficient. The setting portion 302 sets the filter processing time to the delay portion 304 as the delay time.

Then, the setting portion 302 outputs an operation completion notification to the control portion 301. Receiving the operation completion notification, the control portion 301 controls the changeover switch SW1 to connect the delay portion 304 and the DAC 34, controls the changeover switch SW2 to connect the FIR filter 303 and the DAC 36, and controls the changeover switch SW3 to connect the ADC 31A and the sound adjustment portion 32.

The FIR filter 303 filters the first signal D1 outputted by the sound adjustment portion 32 based on the filter coefficient and generates a ninth signal D9. Specifically, the FIR filter 303 performs, on the first signal D1, inversion and multiplication of the coefficient identified by (transfer function Hfr/the transfer function Hfl), thereby generating the ninth signal D9. Consequently, the ninth signal D9 is a signal which is the first signal D1 multiplied by the coefficient H1 (H1=−[transfer function Hfr/transfer function Hfl]). The ninth signal D9 is an example of a second processing signal.

The ninth signal D9 is converted from a digital signal to an analog signal by the DAC 36 and amplified by the amplifier 37, and then, supplied to the second speaker 22 as a ninth sound signal S9. The ninth sound signal S9 is another example of the second sound signal.

The second speaker 22 emits a sound responsive to the ninth sound signal S9. The sound emitted by the second speaker 22 passes through the second space to head for the first microphone 11. The sound emitted by the second speaker 22 is influenced by the transfer function Hfl of the second space by passing through the second space. For this reason, the sound emitted by the second speaker 22 is influenced by the product of the filter coefficient H1 of the FIR filter 303 and the transfer function Hfl, that is, −(transfer function Hfr/transfer function Hfl)×transfer function Hfl=− transfer function Hfr in the neighborhood of the first microphone 11.

The delay portion 304 delays the first signal D1 outputted by the sound adjustment portion 32 by the time required for the filtering processing at the FIR filter 303 (that is, the time required for the generation of the second processing signal) and outputs it. For this reason, the output timing difference is eliminated between the first signal D1 outputted from the delay portion 304 and the ninth signal D9 outputted from the FIR filter 303.

The generation portion 40A generates the first sound signal S1 responsive to the first signal D1 by using the first signal D1 as a first processing signal.

Here, explaining the relation between the first signal D1 as the first processing signal and the ninth signal D9 as the second processing signal, the ninth signal D9 is the same as the signal generated when the signal which is the first signal D1 multiplied by a coefficient (transfer function Hfr/transfer function Hfl) is inverted.

The first sound signal S1 is supplied to the first speaker 21. The first speaker 21 emits a sound responsive to the first sound signal S1. The sound emitted by the first speaker 21 passes through the first space to head for the first microphone 11. The sound emitted by the first speaker 21 is influenced by the transfer function Hfr of the first space by passing through the first space. For this reason, the sound emitted by the first speaker 21 is influenced by the transfer function Hfr in the neighborhood of the first microphone 11.

On the other hand, as mentioned above, the sound emitted by the second speaker 22 is influenced by −transfer function Hfr in the neighborhood of the first microphone 11.

Therefore, in the neighborhood of the first microphone 11, the sound emitted by the first speaker 21 and the sound emitted by the second speaker 22 are opposite to each other in phase and easily cancel out each other. Consequently, howling is suppressed.

Figure 12:
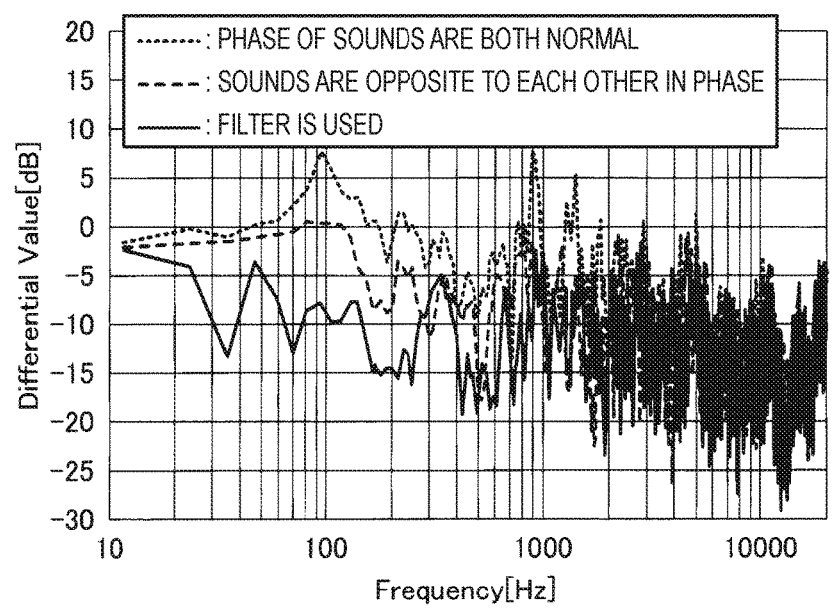
FIG. 12 is a graph showing the difference in frequency characteristic between the original sound collected by the microphone and the sound collected by the microphone again.

FIG. 12 shows the difference in frequency characteristic between a sound Z and a sound Z' when the sound collected by the first microphone 11 is "Z" and the sound which is the sound Z emitted from the first speaker 21 and the second speaker 22 and returning to the first microphone 11 to be collected again is "Z". FIG. 12 and FIG. 5 are different from each other in the vehicle C (further, the vehicle interior R) mounted with the howling suppression device.

The dotted line shown in FIG. 12 indicates the difference in frequency characteristic in a comparative example of the fourth embodiment. Specifically, the dotted line shown in FIG. 12 indicates the difference in frequency characteristic between the sound Z and the sound Z' when the phases of the sounds emitted from the first speaker 21 and the second speaker 22 are both normal (the same).

The broken line shown in FIG. 12 also indicates the difference in frequency characteristic in the comparative example of the fourth embodiment. Specifically, the broken line shown in FIG. 12 indicates the difference in frequency characteristic between the sound Z and the sound Z' when the sounds emitted from the first speaker 21 and the second speaker 22 are opposite to each other in phase.

The solid line shown in FIG. 12 indicates the difference in frequency characteristic in the fourth embodiment. When the difference in frequency characteristic shown in FIG. 12 is a positive value, the gain of the path from the first microphone 11, the first sound signal generation portion 30A, the first speaker 21 and the second speaker 22 to the first microphone 11 exceeds "1", which results in amplification.

As is apparent from the figure, it is understood that no amplification path occurs over a wide band when the sounds are emitted so that the difference in the transfer function of the space where the sounds pass is cancelled as in the fourth embodiment compared with when the sounds are emitted from the first speaker 21 and the second speaker 22 in the same phase and when the sounds are emitted from the first speaker 21 and the second speaker 22 in the opposite phases. For this reason, the sound emitted from the first speaker 21 and the sound emitted from the second speaker 22 cancel out each other in the neighborhood of the first microphone 11, whereby howling is suppressed.

In the present embodiment, when the time of filter processing at the FIR filter 303 is within a preset permissible time range, the delay portion 304 may be omitted.

Moreover, in the present embodiment, the second processing portion B may be structured similarly to the first processing portion A shown in FIG. 11 or may be structured similarly to the second processing portion B shown in FIG. 3.

5. Fifth Embodiment

In the howling suppression device 400 according to the fourth embodiment, for example, as shown in FIG. 7, when the distance L1 from the first speaker 21 to the first microphone 11 and the distance L2 from the second speaker 22 to the first microphone 11 are different by the differential distance ΔL, it is difficult for the sound emitted from the first speaker 21 and the sound emitted from the second speaker 22 to cancel out each other as described in the second embodiment.

In a howling suppression device 500 according to the fifth embodiment, in the howling suppression device 400 according to the fourth embodiment, the difference between the timing when the first sound signal S1 reaches the first speaker 21 and the timing when the ninth sound signal S9 reaches the second speaker 22 is adjusted by the differential time ΔT corresponding to the differential distance ΔL.

In the fifth embodiment, as shown in FIG. 7, the distance L1 is longer than the distance L2 by the differential distance ΔL.

Figure 13:
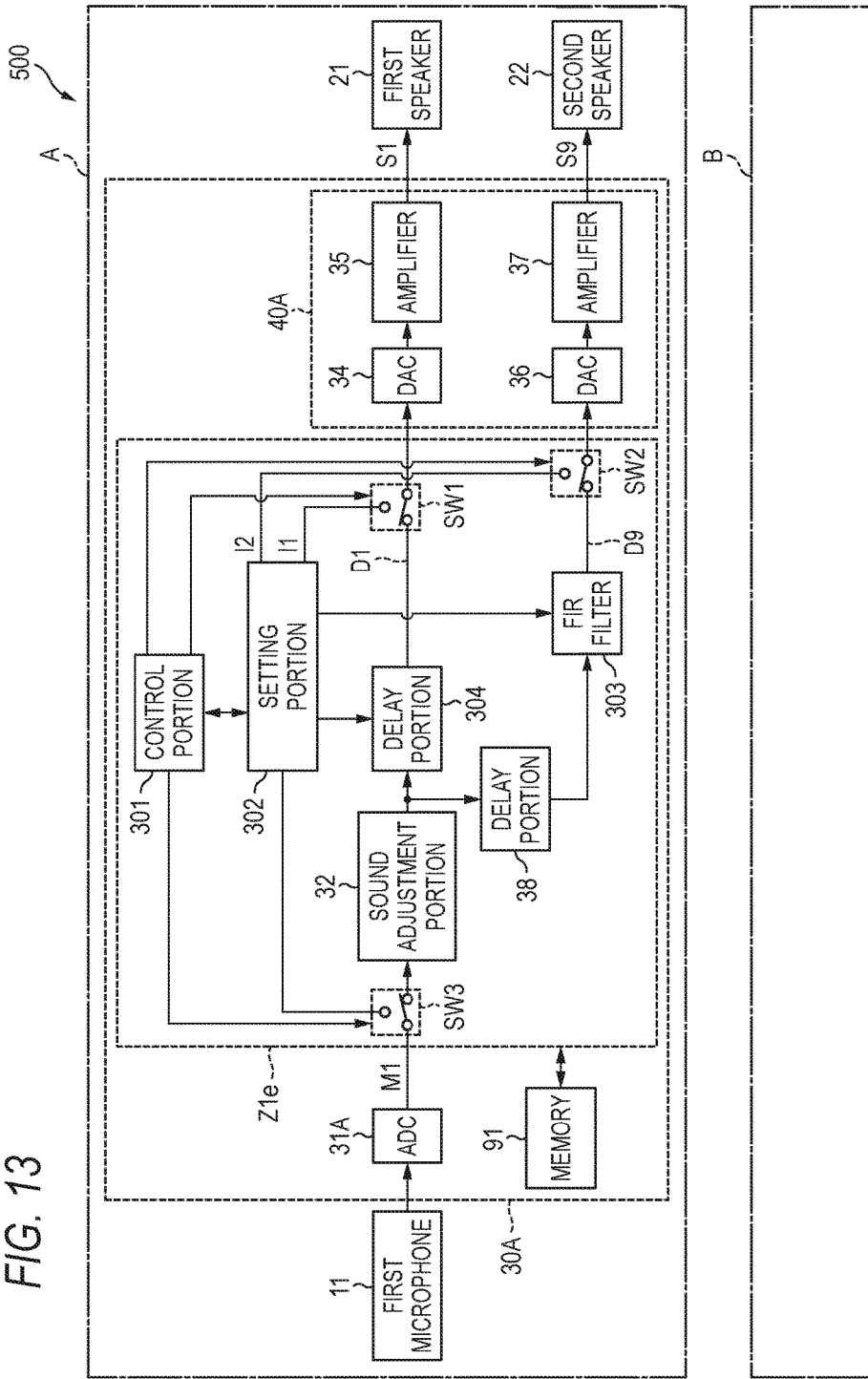
FIG. 13 is a block diagram showing an example of the structure of a howling suppression device according to a fifth embodiment.

FIG. 13 is a block diagram of the howling suppression device 500 according to the fifth embodiment. The howling suppression device 500 according to the fifth embodiment is different from the howling suppression device 400 according to the fourth embodiment in that in a first signal processing portion Z1e, the delay portion 38 shown in FIG. 8 is added between the sound adjustment portion 32 and the FIR filter 303. The delay portion 38 may be provided between the FIR filter 303 and the DAC 36. The delay portion 38 may be formed of an analog circuit and the delay portion 38 formed of an analog circuit may be provided in front of or behind the amplifier 37.

Since the delay portion 38 delays the first signal D1 inputted to the FIR filter 303, the ninth sound signal S9 reaches the second speaker 22 being delayed by the differential time ΔT resulting from the differential distance ΔL from the timing when the first sound signal S1 reaches the first speaker 21. Therefore, in the neighborhood of the first microphone 11, the sound from the first speaker 21 and the sound from the second speaker 22 are opposite to each other in phase and easily canceled out by each other. For this reason, howling can be suppressed.

When the distance L1 is shorter than the distance L2 by the differential distance ΔL, for example, "0" is set to the delay portion 38 as the delay time, and the time which is the sum of the time of filter processing at the FIR filter 303 and the delay time ΔT is set to the delay portion 304 as the delay time. In this case, in the neighborhood of the first microphone 11, the sound from the first speaker 21 and the sound from the second speaker 22 are also canceled out by each other. For this reason, howling can be suppressed.

When the distance L1 is shorter than the distance L2 by the differential distance ΔL, the howling suppression device 400 shown in FIG. 11 may be used. That is, the delay portion 38 may be deleted from the structure shown in FIG. 13.

In the present embodiment, the second processing portion B may be structured similarly to the first processing portion A shown in FIG. 13 or may be structured similarly to the second processing portion B shown in FIG. 3 or FIG. 11.

In the fourth and fifth embodiments, the filter coefficient of the FIR filter 303 may be preset and fixed before the shipment of the howling suppression device. In this case, it is preferable that the delay amount at the delay portion 304 be also preset and fixed based on the filter coefficient of the FIR filter 303 before the shipment of the howling suppression device.

In the fourth and fifth embodiments, when a plurality of filter coefficients previously calculated according to the number of passengers, the positions of the passengers, the seat arrangement or the like are stored in the memory 91 and a detection portion that detects the number of passengers, the positions of the passengers, the seat arrangement or the like is provided, the setting portion 302 may set, of the plurality of filter coefficients stored in the memory 91, a filter coefficient corresponding to the detection result of the detection portion, to the FIR filter 303.

Further, a structure may be adopted in which an operation portion that accepts the operation to select any of the plurality of filter coefficients stored in the memory 91 is provided and the setting portion 302 sets, of the plurality of filter coefficients stored in the memory 91, the filter coefficient selected by the operation accepted by the operation portion, to the FIR filter 303. In this case, the detection portion may be omitted.

When a plurality of filter coefficients are stored in the memory 91, a structure may be adopted in which the delay amount at the delay portion 304 is previously calculated for each filter coefficient and stored in the memory 91 and the setting portion 302 sets, to the delay portion 304, a delay amount corresponding to the filter coefficient set to the FIR filter 303.

As described above, when the filter coefficient of the FIR filter 303 is fixed and when a filter coefficient stored in the memory 91 is set as the filter coefficient of the FIR filter 303, it is unnecessary for the setting portion 302 to estimate the transfer function, so that the changeover switches SW1 to SW3 may be omitted. When the changeover switches SW1 to SW3 are omitted, as a matter of course, it is unnecessary for the control portion 301 to control the changeover switches SW1 to SW3.

6. Sixth Embodiment

In the fourth embodiment and the fifth embodiment, the FIR filter 303 is used in order to reduce the influence due to the difference between the transfer function Hfr and the transfer function Hfl.

In a howling suppression device 600 of a sixth embodiment, in addition to the FIR filter 303, an FIR filter 305 is used in order to reduce the influence due to the difference between the transfer function Hfr and the transfer function Hfl.

Figure 14:
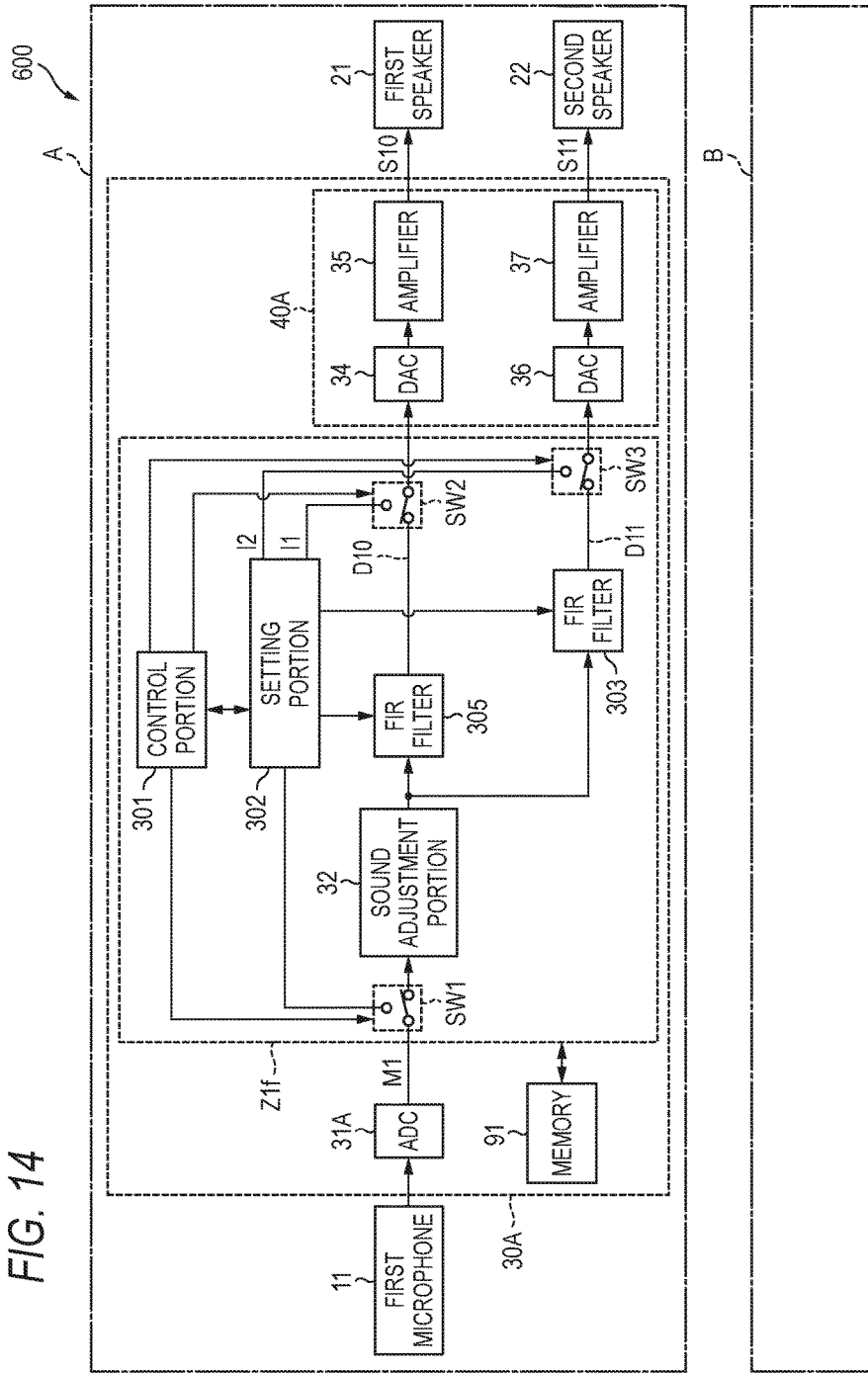
FIG. 14 is a block diagram showing an example of the structure of a howling suppression device according to a sixth embodiment.

FIG. 14 is a block diagram of the howling suppression device 600 according to the sixth embodiment.

In the sixth embodiment, as in the fourth embodiment, the distance from the first speaker 21 to the first microphone 11 and the distance from the second speaker 22 to the first microphone 11 are substantially equal to each other, and the distance from the third speaker 23 to the second microphone 12 and the distance from the fourth speaker 24 to the second microphone 12 are substantially equal to each other.

The howling suppression device 600 according to the sixth embodiment is different from the howling suppression device 400 according to the fourth embodiment in that the FIR filter 305 is used instead of the delay portion 304 in a first signal processing portion Z1f.

In the howling suppression device 600, the setting portion 302 sets a coefficient H2 indicative of the transfer function Hfr as the filter coefficient of the FIR filter 303. The setting portion 302 sets a coefficient H3 indicative of a value which is the transfer function Hfl multiplied by −1 (−transfer function Hfl) as the filter coefficient of the FIR filter 305. The setting portion 302 uses a value which is the transfer function Hfr multiplied by −1 (−transfer function Hfr) as the coefficient H2, and uses the coefficient indicative of the transfer function Hfl as the coefficient H3.

For this reason, a tenth signal D10 outputted by the FIR filter 305 and a tenth sound signal S10 generated based on the tenth signal D10 are influenced by the transfer function Hfl. The tenth signal D10 is another example of the first processing signal. The tenth sound signal S10 is another example of the first sound signal.

Moreover, an eleventh signal D11 outputted by the FIR filter 303 and an eleventh sound signal S11 generated based on the eleventh signal D11 are influenced by the transfer function Hfr. The eleventh signal D11 is another example of the second processing signal. The eleventh sound signal S11 is another example of the second sound signal.

Here, explaining the relation between the tenth signal D10 as the first processing signal and the eleventh signal D11 as the second processing signal, the eleventh sound signal S11 is the same as a signal generated when the signal which is the tenth signal D10 multiplied by a coefficient (transfer function Hfl/transfer function Hfr) is inverted.

In the neighborhood of the first microphone 11, the sound emitted by the first speaker 21 becomes a sound influenced by both the transfer function Hfl resulting from the filter coefficient of the FIR filter 305 and the transfer function Hfr of the first space where the sound passes before reaching the first microphone 11 (−Hfl×Hfr).

On the other hand, in the neighborhood of the first microphone 11, the sound emitted by the second speaker 22 becomes a sound influenced by both the transfer function Hfr resulting from the filter coefficient of the FIR filter 303 and the transfer function Hfl of the second space where the sound passes before reaching the first microphone 11 (Hfr×Hfl).

Therefore, in the neighborhood of the first microphone 11, the sound emitted by the first speaker 21 and the sound emitted by the second speaker 22 are opposite to each other in phase and are canceled out by each other. For this reason, howling can be suppressed.

In the present embodiment, the delay caused in the filter processing at the FIR filter 303 is also caused in the filter processing at the FIR filter 305. For this reason, the need for the delay portion 304 used in the fourth embodiment and the fifth embodiment can be eliminated.

7. Seventh Embodiment

In the howling suppression device 600 according to the sixth embodiment, when the distance L1 from the first speaker 21 to the first microphone 11 and the distance L2 from the second speaker 22 to the first microphone 11 are different by the differential distance ΔL, it is difficult for the sound emitted from the first speaker 21 and the sound emitted from the second speaker 22 to cancel out each other as described in the second embodiment.

In a howling suppression device 700 according to a seventh embodiment, in the howling suppression device 600 according to the sixth embodiment, the difference between the timing when the tenth sound signal S10 reaches the first speaker 21 and the timing when the eleventh sound signal S11 reaches the second speaker 22 is adjusted by the differential time ΔT corresponding to the differential distance ΔL.

In the seventh embodiment, as shown in FIG. 7, the distance L1 is longer than the distance L2 by the differential distance ΔL.

Figure 15:
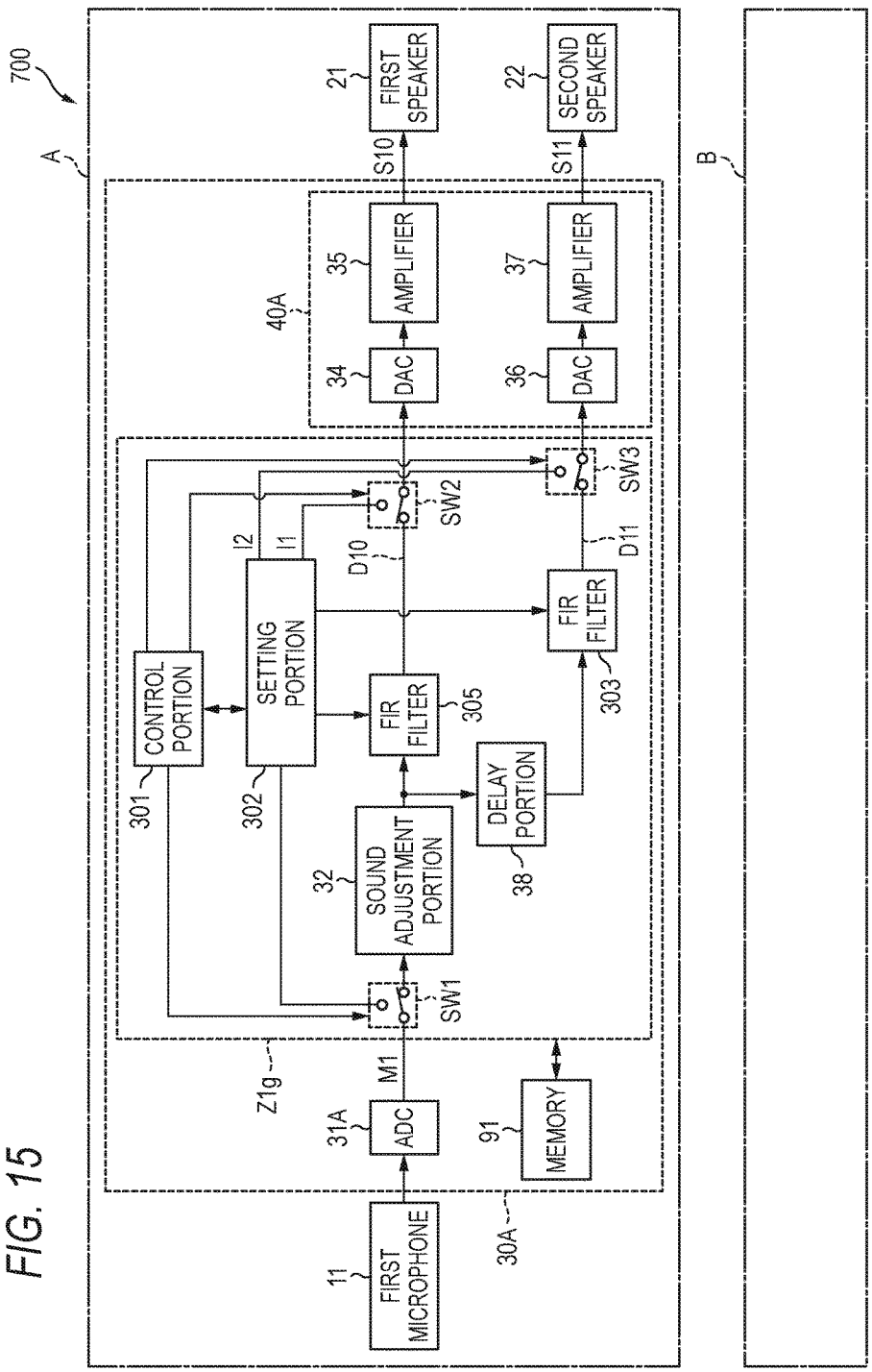
FIG. 15 is a block diagram showing an example of the structure of a howling suppression device according to a seventh embodiment.

FIG. 15 is a block diagram of the howling suppression device 700 according to the seventh embodiment.

The howling suppression device 700 according to the seventh embodiment is different from the howling suppression device 600 according to the sixth embodiment in that in a first signal processing portion Z1g, the delay portion 38 shown in FIG. 8 is added between the sound adjustment portion 32 and the FIR filter 303. The delay portion 38 may be provided between the FIR filter 303 and the DAC 36. The delay portion 38 may be formed of an analog circuit and the delay portion 38 formed of an analog circuit may be provided in front of or behind the amplifier 37.

Since the delay portion 38 delays the first signal D1 inputted to the FIR filter 303, the eleventh sound signal S11 reaches the second speaker 22 being delayed by the differential time ΔT resulting from the differential distance ΔL from the timing when the tenth sound signal S10 reaches the first speaker 21. Therefore, in the neighborhood of the first microphone 11, the sound from the first speaker 21 and the sound from the second speaker 22 are canceled out by each other. For this reason, howling can be suppressed.

Figure 16:
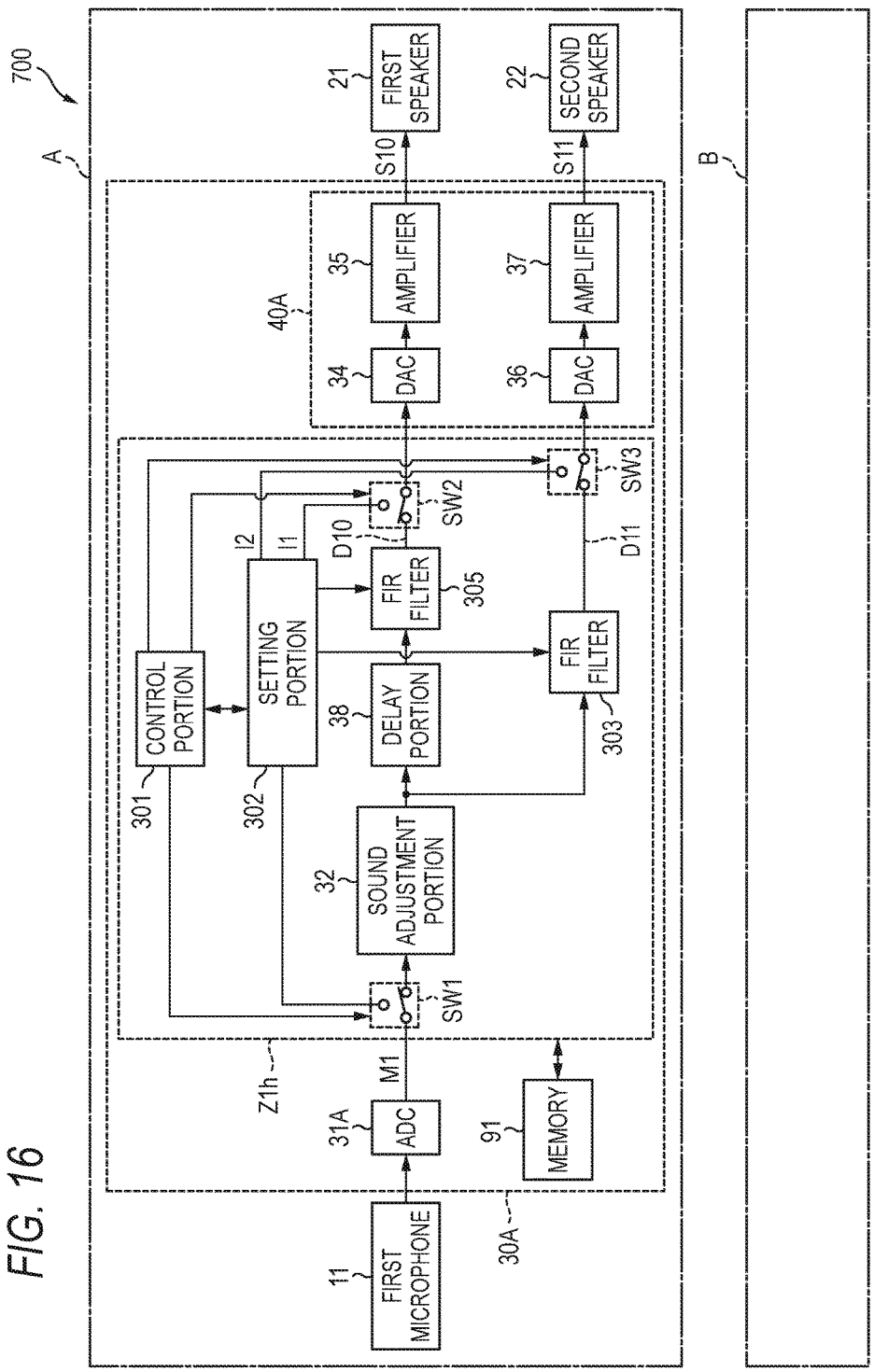
FIG. 16 is a block diagram showing another example of the structure of the howling suppression device according to the seventh embodiment.

When the distance L1 is shorter than the distance L2 by the differential distance ΔL, the howling suppression device 700 is modified as shown in FIG. 16. In FIG. 16, in a first signal processing portion Z1h, the delay portion 38 is disposed between the sound adjustment portion 32 and the FIR filter 305. The delay portion 38 may be provided between the FIR filter 303 and the DAC 34. The delay portion 38 may be formed of an analog circuit and the delay portion 38 formed of an analog circuit may be provided in front of or behind the amplifier 37.

When the distance L1 is shorter than the distance L2 by the differential distance ΔL, the tenth sound signal S10 reaches the first speaker 21 being delayed by the differential time ΔT resulting from the differential distance ΔL from the timing when the eleventh sound signal S11 reaches the second speaker 22. Therefore, in the neighborhood of the first microphone 11, the sound from the first speaker 21 and the sound from the second speaker 22 are canceled out by each other. For this reason, howling can be suppressed.

In the present embodiment, the second processing portion B may be structured similarly to the first processing portion A shown in FIG. 15 or FIG. 16.

In the sixth and seventh embodiments, the filter coefficients of the FIR filter 303 and the FIR filter 305 may be preset and fixed before the shipment of the howling suppression device.

In the sixth and seventh embodiments, when a plurality of transfer coefficients Hfr and a plurality of transfer coefficients Hfl previously calculated according to the number of passengers, the positions of the passengers, the seat arrangement or the like are stored in the memory 91 and a detection portion that detects the number of passengers, the positions of the passengers, the seat arrangement or the like is provided, the setting portion 302 may set the filter coefficients of the FIR filters 303 and 305 as follows:

The setting portion 302 sets, of the plurality of transfer coefficients Hfr stored in the memory 91, the transfer function Hfr corresponding to the detection result of the detection portion as the filter coefficient of the FIR filter 303. Further, the setting portion 302 sets, as the filter coefficient of the FIR filter 305, a value obtained by multiplying by −1 the transfer function Hfl, corresponding to the detection result of the detection portion, of the plurality of transfer functions Hfl stored in the memory 91.

As described above, when the filter coefficients of the FIR filter 303 and the FIR filter 305 are fixed and when the filter coefficients of the FIR filter 303 and the FIR filter 305 are set by using the transfer function stored in the memory 91, it is unnecessary for the setting portion 302 to estimate the transfer function, so that the changeover switches SW1 to SW3 may be omitted. When the changeover switches SW1 to SW3 are omitted, as a matter of course, it is unnecessary for the control portion 301 to control the changeover switches SW1 to SW3.

8. Modifications

The above first embodiment and second embodiment may be modified variously. Concrete modes of modifications will be shown below by example. Two or more modes arbitrarily selected from the following examples may be annexed as appropriate as long as no contradiction arises.

<8-1: First Modification>

In the above-described embodiments, in the neighborhood of the first microphone 11, part or all of the sound emitted from the first speaker 21 is canceled out by the sound emitted from the second speaker 22 and part or all of the sound emitted from the third speaker 23 is canceled out by the sound emitted from the fourth speaker 24, whereby howling is suppressed. The present invention is not limited thereto, and the pitch of the first input sound signal M1 may be changed by the sound adjustment portion 32. For example, the sound adjustment portion 32 may generate the first signal D1 by performing, on the first input sound signal M1, pitch conversion processing to change the pitch by predetermined cents. For example, it is preferable to perform pitch conversion by not more than ten cents. This is because the conversation is barely felt unnatural if the pitch change is by not more than ten cents.

A cause of the howling is the positive feedback of the output signal to the input. When the pitch conversion processing is performed, for example, the sound collected by the first microphone 11 is different in frequency from the sounds emitted from the first speaker 21 and the second speaker 22 because it undergoes the pitch conversion. For this reason, it is difficult for the output signal to be fed back to the input.

The howling suppression described in the above embodiments is based on the premise that a sound of the normal phase and a sound of the reverse phase cancel out each other in the neighborhood of the first microphone 11 and the second microphone 12, and it is necessary that the vehicle interior R be in an ideal state. However, in actuality, the user sits or baggage is put on a seat. For this reason, the sounds from the speakers 21 to 24 reach the first microphone 11 and the second microphone 12 while being reflected at obstacles. Even if a time delay occurs due to the influence of reflection, a sound of the normal phase and a sound of the reverse phase can cancel out each other in a low frequency region. On the other hand, the effect is reduced in a high frequency region. Since the pitch conversion is effective even in a high frequency region, it is preferable to combine two kinds of howling suppression methods.

<8-2: Second Modification>

In the above-described embodiments and modification, a normal audio reproduction device and the howling suppression device 100 (200, 300) for supporting conversation may be made common.

Figure 17:
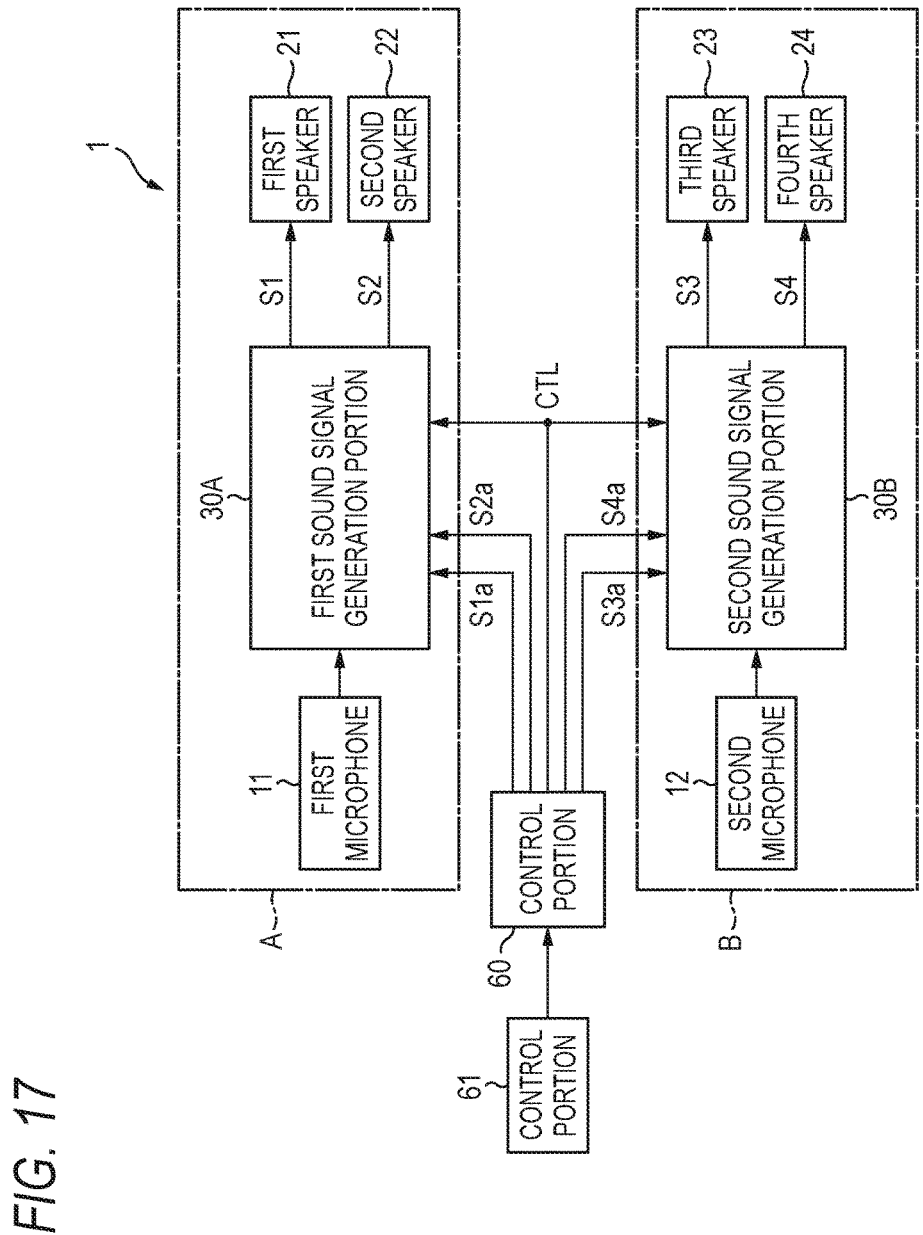
FIG. 17 is a block diagram showing the structure of an audio system according to a modification.

FIG. 17 is a block diagram of an audio system 1 according to a modification. The audio system 1 shown in this figure is structured by using the howling suppression device 100 of the first embodiment. The audio system 1 is provided with a control portion 60, an operation portion 61, the first processing portion A and the second processing portion B. The operation portion 61 is, for example, a touch panel or a switch where selection can be made between conversation support and audio reproduction. An operation signal responsive to the user's operation is outputted to the control portion 60. The control portion 60 is formed of a CPU, and functions as the control center of the audio system 1. Moreover, the control portion 60 to which a non-illustrated audio device is connected outputs a sound signal S1a for output to the first speaker 21, a sound signal S2a for output to the second speaker 22 and a control signal CTL to the first sound signal generation portion 30A.

Moreover, the control portion 60 outputs a sound signal S3a for output to the third speaker 23, a sound signal S4a for output to the fourth speaker 24 and the control signal CTL to the second sound signal generation portion 30B.

The control portion 60 determines which of conversation support and audio reproduction is to be prioritized according to a predetermined rule, sets the control signal CTL to high level when conversation support is prioritized, and sets the control signal CTL to low level when audio reproduction is prioritized.

For example, the following rules may be followed: A first rule is to prioritize the one of conversation support and audio reproduction that is most recently selected by the user. For example, when the user performs an audio reproduction operation by using the operation portion 61 during conversation support, conversation support is stopped and audio reproduction is executed. That is, the first sound signal generation portion 30A does not receive the sound signal M1 outputted from the first microphone 11, receives the sound signal S1*a* and the sound signal S2*a* from the control portion 60, generates the first sound signal S1 and the second sound signal S2 and outputs them to the first speaker 21 and the second speaker 22. Likewise, the second sound signal generation portion 30B does not receive the signal outputted from the second microphone 12, receives the sound signal S3*a* and the sound signal S4*a* from the control portion 60, generates the third sound signal S3 and the fourth sound signal S4 and outputs them to the third speaker 23 and the fourth speaker 24.

A second rule is to prioritize conversation support at all times. According to this rule, during conversation support, conversation support is continued even if the audio reproduction operation is present as long as the user performs a conversation support end operation by using the operation portion 61. The second rule has an advantage in that conversation support can be prioritized.

<8-3: Third Modification>

In the above-described embodiments and modifications, the directivity of the first microphone 11 and the second microphone 12 does not matter. However, it is preferable that the first microphone 11 and the second microphone 12 be unidirectional. If a microphone having directivity in both directions is used as the first microphone 11, directivity is present not only for the seat 53 and the seat 54 in the rear but also for the front part. For this reason, the first microphone 11 actively collects the sounds emitted from the first speaker 21 and the second speaker 22, so that howling is more likely to occur. On the contrary, if the first microphone 11 having directivity for the seat 53 and the seat 54 in the rear and having no directivity for the front part is used, howling can be suppressed.

<8-4: Fourth Modification>

While in the above-described third embodiment, the noise analysis portion 55 determines the magnitude of the running noise based on the first input sound signal M1 and the second input sound signal M2, the present invention is not limited thereto, and any method may be applied as long as the magnitude of the running noise can be determined. For example, the noise analysis portion 55 may determine the magnitude of the running noise by comparing the engine speed with a threshold value. Moreover, the noise analysis portion 55 may identify the magnitude of the running noise based on the first input sound signal M1 and the second input sound signal M2, and the engine speed. Further, the noise analysis portion 55 may be provided with a vibration sensor and identify the running noise in consideration of the vibration of the vehicle body outputted from the vibration sensor. When the vehicle runs on a paved road, although the running noise is small compared with when the vehicle runs on an unpaved road, if the vibration of the vehicle body detected by the vibration sensor is considered, the magnitude of the running noise can be identified while the condition of the road where the vehicle is running is taken into account.

<8-5: Fifth Modification>

While in the above-described third embodiment, a combination of the echo cancellation processing and the first embodiment is described, the present invention is not limited thereto, and it is needless to say that the second embodiment described with reference to FIG. 8 or the modification of the second embodiment described with reference to FIG. 9 may be combined with the echo cancellation processing.

While in the above-described embodiments, the howling suppression devices 100, 200 and 300 that suppress howling inside the vehicle interior R are described, the present invention is not limited thereto, and they may be a howling suppression device that suppress howling in a room. For example, the howling suppression devices may be used on ships and trains.

<8-6: Sixth Modification>

In the above-described third embodiment, the interference between the first line to transmit the voice of the user at a rear seat to the user at a front seat and the second line to transmit the voice of the user at a front seat to the user at a rear seat is reduced. However, the present invention is not limited thereto, and it is needless to say that the present invention may be used for echo cancellation at the first line or the second line.

Figure 18:
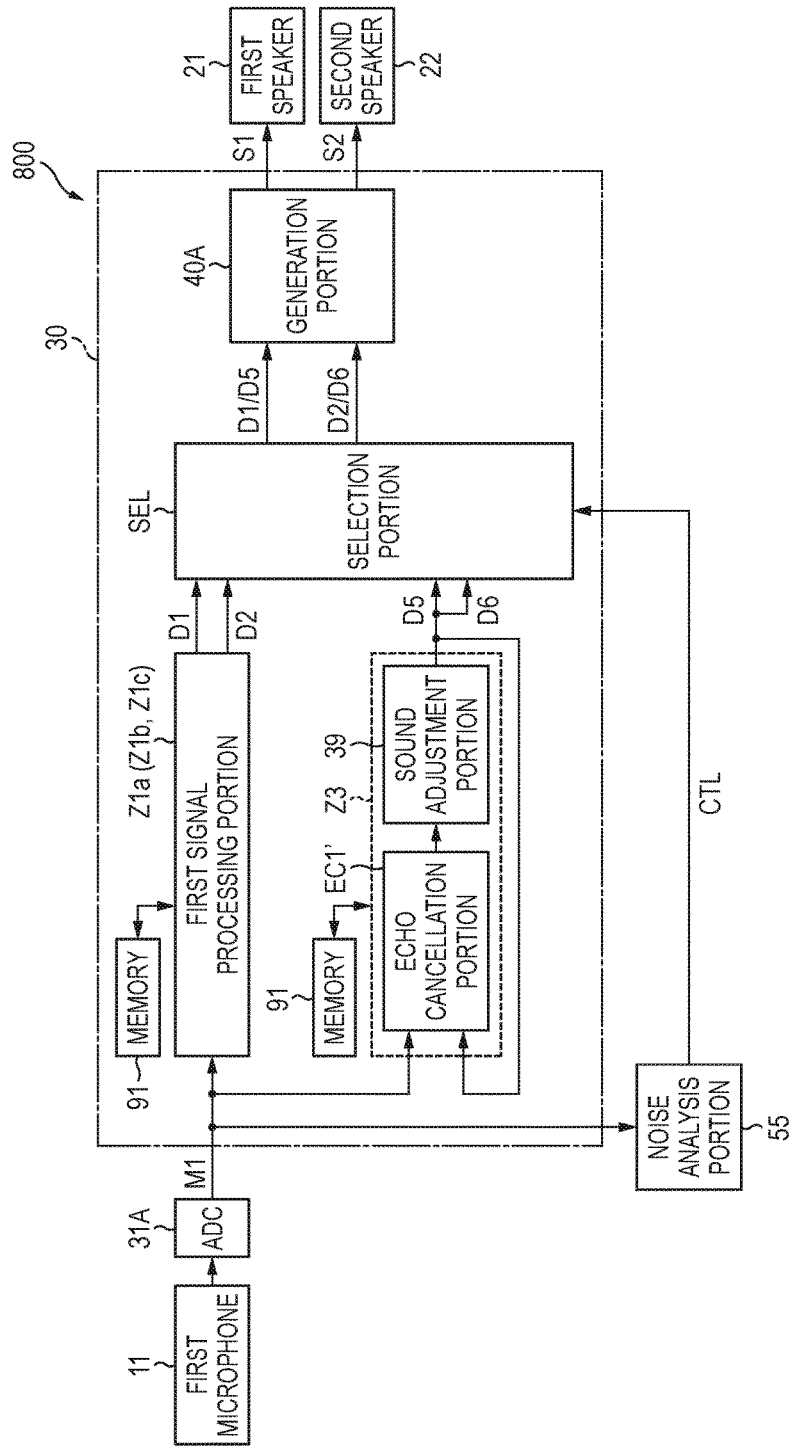
FIG. 18 is a block diagram showing an example of a howling suppression device according to a modification.

FIG. 18 is a block diagram showing the structure of a howling suppression device 800 where echo cancellation is applied to the first line. In the howling suppression device 800, the structure associated with the second line is deleted from the howling suppression device 300 shown in FIG. 10, and the fifth signal D5 is fed back to the third signal processing portion Z3.

An echo cancellation portion EC1' removes the echo component contained in the first input sound signal M1. Specifically, the transfer function from the first speaker 21 and the second speaker 22 to the first microphone 11 is simulated by using an FIR filter or the like and the fifth signal D5 which is the output signal of the third signal processing portion Z3 is inputted to the FIR filter, whereby the echo component is estimated. Then, the echo component is removed by subtracting the estimated echo component from the first input sound signal M1.

The selection portion SEL is the same as that of the howling suppression device 300 of the third embodiment shown in FIG. 10 in that it outputs the first signal D1 and the second signal D2 when the running noise is less than the threshold value and it outputs the fifth signal D5 and the sixth signal D6 which are the first input sound signal M1 having undergone the echo cancellation processing when the running noise is not less than the threshold value.

Thereby, when the running noise is small, the sound signal generation portion 30 can generate the first signal D1 by processing the first input sound signal M1, generate the first sound signal S1 based on the first signal D1 and generate the second sound signal S2 based on the second signal D2 which is the first signal D1 that is inverted, and when the running noise is large, the sound signal generation portion 30 can generate the first sound signal S1 and the second sound signal S2 based on the signal which is the first input sound signal M1 having undergone the echo cancellation processing. Consequently, howling can be suppressed in a wide range from a condition where the running noise is small to a condition where the running noise is large.

9. Modes Grasped from at Least One of the Embodiments and the Modifications

The following modes are grasped from at least one of the above-described embodiments and modifications.

A mode of the howling suppression device is provided with: the first speaker and the second speaker provided in the vehicle interior; and the sound signal generation portion that supplies the first speaker with the first sound signal generated based on the output signal of the microphone, and supplies the second speaker with the second sound signal generated so that part or all of the sound emitted from the first speaker is canceled out by the sound emitted from the second speaker at the microphone based on the output signal of the microphone.

According to this mode, since the sounds emitted from the two speakers are canceled out in the space in the neighborhood of the microphone, the user who is present in the neighborhood of the speakers can be made to hear the sounds emitted from the speakers while howling is suppressed.

In the above-described mode, preferably, the sound signal generation portion generates the first sound signal based on the first signal generated by processing the input sound signal and generates the second sound signal based on the second signal which is the first signal that is inverted, and the microphone converts the collected sound to the input sound signal and outputs it and is provided in the position inside the vehicle interior where the time from when the input sound signal is inputted to the sound signal generation portion to when the sound emitted by the first speaker based on the first sound signal reaches the microphone and the time from when the input sound signal is inputted to the sound signal generation portion to when the sound emitted by the second speaker based on the second sound signal reaches the microphone are substantially equal to each other.

According to this mode, the second sound signal is inverted with respect to the first sound signal. Further, since the time from when the sound signal is outputted from the microphone to when the sound of the first speaker reaches the microphone and the time to when the sound of the second microphone reaches the microphone are substantially equal to each other, part or all of the sound from the first speaker can be canceled out by the sound from the second speaker before the sound is inputted to the microphone. As a result, howling can be suppressed.

In the above-described mode, preferably, the distance from the first speaker to the microphone is substantially equal to the distance from the second speaker to the microphone, and phases of the first sound signal and the second sound signal are in a relation such that one is the normal phase and the other is the reverse phase. According to this mode, since the distance from the first speaker to the microphone is equal to the distance from the second speaker to the microphone, the sound from the first speaker and the sound from the second speaker can be canceled out in the neighborhood of the microphone. As a result, howling can be suppressed.

In the above-described mode, preferably, the sound signal generation portion generates the first sound signal based on the first processing signal generated by processing the output signal of the microphone, and generates the second sound signal based on the second processing signal generated by processing the output signal of the microphone, the second processing signal is the same as the signal generated when the signal which is the first processing signal multiplied by a coefficient is inverted, and the coefficient indicates the value calculated by dividing the transfer function of the space from the first speaker to the microphone by the transfer function of the space from the second speaker to the microphone.

According to this mode, in the space in the neighborhood of the microphone, the sound emitted from the first speaker becomes a sound responsive to the product of the first processing signal and the transfer function of the space from the first speaker to the microphone, and the sound emitted from the second speaker becomes a sound responsive to the product of the second processing signal and the transfer function of the space from the second speaker to the microphone.

The second processing signal is the same as the signal generated when the signal which is the first processing signal multiplied by the coefficient (the value calculated by dividing the transfer function of the space from the first speaker to the microphone by the transfer function of the space from the second speaker to the microphone) is inverted.

For this reason, when the second processing signal is represented by using the first processing signal, in the space in the neighborhood of the microphone, the sound emitted from the second speaker becomes the sound responsive to the product of the first processing signal and the transfer function of the space from the first speaker to the microphone which product is inverted.

Therefore, even if the transfer function of the space from the first speaker to the microphone is different from the transfer function of the space from the second speaker to the microphone, in the space in the neighborhood of the microphone, the sound from the first speaker and the sound from the second speaker are opposite to each other in phase and can be made easily canceled out by each other. As a result, howling can be suppressed.

In the above-described mode, preferably, the sound signal generation portion generates the first sound signal by using, as the first processing signal, a first signal generated by processing the output signal of the microphone, and supplies the first speaker with the first sound signal in a state of being delayed by the time required for the generation of the second processing signal generated by performing inversion and multiplication of the coefficient on the first signal.

According to this mode, the timing when the first sound signal is supplied to the first speaker and the timing when the second sound signal is supplied to the second speaker can be made the same. For this reason, for example, when the distance from the first speaker to the microphone is equal to the distance from the second speaker to the microphone, the sound from the first speaker and the sound from the second speaker are easily canceled out by each other in the neighborhood of the microphone. As a result, howling can be suppressed.

In the above-described mode, preferably, the sound signal generation portion generates the first sound signal by performing multiplication of the transfer function of the space from the second speaker to the microphone on the first signal generated by processing the output signal of the microphone, and generates the second sound signal by performing inversion and multiplication of the transfer function of the space from the first speaker to the microphone on the first signal.

According to this mode, even if the transfer function of the space from the first speaker to the microphone is different from the transfer function of the space from the second speaker to the microphone, in the space in the neighborhood of the microphone, the sound emitted by the first speaker and the sound emitted by the second speaker can be made easily canceled out by each other.

In the above-described mode, preferably, the distance from the first speaker to the microphone is longer than the distance from the second speaker to the microphone by the differential distance, and when the time during which the sound travels the differential distance is the differential time, the first signal processing portion delays, by the differential time, the time from when the input sound signal is inputted to when the second sound signal is outputted from the time from when the input sound signal is inputted to when the first sound signal is outputted.

According to this mode, even when the distance between the microphone and the first speaker and the distance between the microphone and the second speaker are different, the sound from the first speaker and the sound from the second speaker can be canceled out in the neighborhood of the microphone. As a result, howling can be suppressed.

In the above-described mode, preferably, the first speaker, the second speaker and the microphone are provided inside the vehicle interior, the first speaker and the second speaker are disposed on the front right and front left doors, respectively, and the microphone is disposed on the ceiling of the vehicle interior. According to this mode, the microphone can be disposed on the ceiling of the vehicle interior.

In the above-described mode, preferably, the first speaker, the second speaker and the microphone are provided inside the vehicle interior, when the running noise is small, the sound signal generation portion generates the first sound signal based on the first signal generated by processing the input sound signal and generates the second sound signal based on the second signal which is the first signal that is inverted, and when the running noise is large, the sound signal generation portion generates the first sound signal and the second sound signal based on the signal generated by performing echo cancellation processing on the input sound signal.

According to this mode, when the running noise is small, a sound with a small echo effect can be reproduced. Further, when the running noise is large, since the sound obtained by the echo cancellation processing can be reproduced, the assist sound can be reproduced at a volume that is not buried in the running noise. In addition, since the echo cancellation processing requires a processing time, the assist sound is reproduced with delay from the direct sound. However, since the direct sound is buried in the running noise when the running noise is large, it is difficult for the user to hear the direct sound even though the echo cancellation processing is executed, so that uncomfortableness due to the echo effect is reduced.

In the above-described mode, preferably, the noise analysis portion is provided that determines whether the running noise is less than the threshold value or not less than the threshold value based on at least one of the input sound signal and the engine speed, and based on the analysis result of the noise analysis portion, the sound signal generation portion outputs the first signal and the second signal when the running noise is less than the threshold value, and outputs the signal which is the input sound signal having undergone the echo cancellation processing when the running noise is not less than the threshold value. According to this mode, the running noise is analyzed, and the howling suppression method can be switched according to the analysis result.

In one mode of the howling suppression method, the first sound signal generated based on the output signal of the microphone is supplied to the first speaker, and the second sound signal generated so that part or all of the sound emitted from the first speaker is canceled out by the sound emitted from the second speaker at the microphone is supplied to the second speaker.

According to this mode, since the sounds emitted from the two speakers are canceled out in the space in the neighborhood of the microphone, the user who is present in the neighborhood of the speakers can be made to hear the sounds emitted from the speakers while howling is suppressed.

Moreover, another mode of the howling suppression device is provided with: the first speaker provided inside the vehicle interior and driven based on the first sound signal; the second speaker driven based on the second sound signal; the third speaker driven based on the third sound signal; the fourth speaker driven based on the fourth sound signal; the first signal processing portion that generates the first signal by processing the first input sound signal and generates the second signal which is the first signal that is inverted; the second signal processing portion that generates the third signal by processing the second input sound signal and generates the fourth signal which is the first signal that is inverted; the third signal processing portion that generates the fifth signal and the sixth signal by performing the processing of reducing the component of the seventh signal on the first input sound signal; the fourth signal processing portion that generates the seventh signal and the eighth signal by performing the processing of reducing the component of the fifth signal on the second input sound signal; the selection portion to which the first signal, the second signal, the third signal, the fourth signal, the fifth signal, the sixth signal, the seventh signal and the eighth signal are inputted and that outputs the first signal, the second signal, the third signal and the fourth signal when the running noise is less than the threshold value and outputs the fifth signal, the sixth signal, the seventh signal and the eighth signal when the running noise is not less than the threshold value; the generation portion that generates the first sound signal based on the first signal or the fifth signal, generates the second sound signal based on the second signal or the sixth signal, generates the third sound signal driving the third speaker based on the third signal or the seventh signal, and generates the fourth sound signal based on the fourth signal or the eighth signal; the first microphone that is provided with the first sound collection portion collecting sound, converts the collected sound to the first input sound signal and outputs it, and is provided in the position inside the vehicle interior where the time from when the first input sound signal is inputted to the first generation portion to when the sound emitted by the first speaker based on the first sound signal reaches the first sound collection portion and the time from when the first input sound signal is inputted to the first generation portion to when the sound emitted by the second speaker based on the second sound signal reaches the first sound collection portion are substantially equal to each other; and the second microphone that is provided with the second sound collection portion collecting sound, converts the collected sound to the second input sound signal and outputs it, and is provided in the position inside the vehicle interior where the time from when the second input sound signal is inputted to the second generation portion to when the sound emitted by the third speaker based on the third sound signal reaches the second sound collection portion and the time from when the second input sound signal is inputted to the second generation portion to when the sound emitted by the fourth speaker based on the fourth sound signal reaches the second sound collection portion are substantially equal to each other.

What is claimed is:
1. A howling suppression device comprising:
a first speaker and a second speaker disposable in a room;
a microphone disposable in the room and configured to convert collected sound in the room to a sound signal and output the sound signal; and
a sound signal generator configured to:
generate a first sound signal based on a first signal generated by processing the sound signal output from the microphone;
generate a second sound signal based on a second signal, which is inverted from the first signal;
supply the first sound signal to the first speaker;

supply the second sound signal to the second speaker so that part or entirety of sound emitted from the first speaker is canceled out at the microphone by sound emitted from the second speaker based on the sound signal output from the microphone; and wherein the microphone is disposed in a position inside the room where a time from when the sound signal output from the microphone is input to the sound signal generator to when the sound emitted by the first speaker based on the first sound signal reaches the microphone and a time from when the sound signal from the microphone is input to the sound signal generator to when the sound emitted by the second speaker based on the second sound signal reaches the microphone are substantially equal to each other.

2. The howling suppression device according to claim 1, wherein the first speaker, the second speaker, and the microphone are disposed so that a distance from the first speaker to the microphone is substantially equal to a distance from the second speaker to the microphone, and phases of the first sound signal and the second sound signal are in a relation so that one is a normal phase and the other is a reverse phase.

3. The howling suppression device according to claim 1, wherein:

the first speaker, the second speaker, and the microphone are disposed so that a distance from the first speaker to the microphone is longer than a distance from the second speaker to the microphone by a differential distance, and a time during which a sound travels the differential distance being a differential time; and the sound signal generator delays, by the differential time, a time from when the sound signal output from the microphone is input to when the second sound signal is output from a time from when the sound signal output from the microphone is input to when the first sound signal is output.

4. The howling suppression device according to claim 1, wherein:

the room is a vehicle interior;

the first speaker and the second speaker are disposed on front right and front left doors of the vehicle interior, respectively; and the microphone is disposed on a ceiling of the vehicle interior.

5. The howling suppression device according to claim 1, wherein:

the room is a vehicle interior;

when a running noise is small, the sound signal generator is configured to generate the first sound signal based on the first signal generated by processing the sound signal output from the microphone and is configured to generate the second sound signal based on the second signal, which is inverted from the first signal; and when the running noise is large, the sound signal generator is configured to generate the first sound signal and the second sound signal based on a signal generated by performing echo cancellation processing on the sound signal output from the microphone.

6. The howling suppression device according to claim 5, further comprising:

a noise analyzer configured to determine whether the running noise is less than a threshold value or not less than the threshold value based on at least one of the sound signal output from the microphone or an engine speed; and wherein based on an analysis result of the noise analyzer, the sound signal generator is configured to output:

the first signal and the second signal when the running noise is less than the threshold value; and a signal, which is the sound signal output from the microphone having undergone the echo cancellation processing, when the running noise is not less than the threshold value.

7. A howling suppression method comprising the steps of:

disposing a first speaker and a second speaker in a room;

disposing a microphone in the room, the microphone being configured to convert collected sound in the room to a sound signal and output the sound signal;

generating a first sound signal based on a first signal generated by processing the sound signal output from the microphone;

generating a second sound signal based on a second signal, which is inverted from the first signal;

supplying the first sound signal to the first speaker;

supplying the second sound signal to the second speaker so that part or entirety of sound emitted from the first speaker is canceled out at the microphone by sound emitted from the second speaker based on the input sound signal output from the microphone; and wherein the microphone is disposed in a position inside the room where a time from when the sound signal output from the microphone is input to the sound signal generator to when the sound emitted by the first speaker based on the first sound signal reaches the microphone and a time from when the sound signal output from the microphone is input to the sound signal generator to when the sound emitted by the second speaker based on the second sound signal reaches the microphone are substantially equal to each other.

8. The howling suppression method according to claim 7, wherein the disposing step disposes the first speaker and the second speaker in relation to the microphone so that a distance from the first speaker to the microphone is substantially equal to a distance from the second speaker to the microphone, and phases of the first sound signal and the second sound signal are in a relation so that one is a normal phase and the other is a reverse phase.

9. The howling suppression method according to claim 7, wherein:

the disposing step disposes the first speaker and the second speaker in relation to the microphone so that a distance from the first speaker to the microphone is longer than a distance from the second speaker to the microphone by a differential distance, and a time during which a sound travels the differential distance being a differential time; and a time from when the sound signal output from the microphone is input to when the second sound signal is output from a time from when the sound signal output from the microphone is input to when the first sound signal is output is delayed by the differential time.

10. The howling suppression method according to claim 7, wherein:

the room is a vehicle interior;

the first speaker and the second speaker are disposed on front right and front left doors of the vehicle interior, respectively; and the microphone is disposed on a ceiling of the vehicle interior.

11. The howling suppression method according to claim 7, wherein:

the room is a vehicle interior;

when a running noise is small, the first sound signal generating step generates the first sound signal based on the first signal generated by processing the sound signal output from the microphone and the second sound signal generating step generates the second sound signal based on the second signal, which is inverted from the first signal; and when the running noise is large, the first and second sound signal generating steps respectively generate the first sound signal and the second sound signal based on a signal generated by performing echo cancellation processing on the sound signal output from the microphone.

12. The howling suppression method according to claim 11, further comprising the step of:
determining whether the running noise is less than a threshold value or not less than the threshold value based on at least one of the sound signal output from the microphone or an engine speed; and
wherein based on an analysis result of the determining process, the and second signal generating steps output:
the first signal and the second signal when the running noise is less than the threshold value; and
a signal, which is the sound signal output from the microphone having undergone the echo cancellation processing, when the running noise is not less than the threshold value.

13. A howling suppression device comprising:
a first speaker and a second speaker disposable in a room;
a microphone disposable in the room and configured to convert collected sound in the room to a sound signal and output the sound signal; and
a sound signal generator configured to:
generate a first sound signal based on a first processing signal generated by processing the sound signal output from the microphone;
generate a second sound signal based on a second processing signal generated by processing the sound signal output from the microphone;
supply the first sound signal to the first speaker;
supply the second sound signal to the second speaker so that part or entirety of sound emitted from the first speaker is canceled out at the microphone by sound emitted from the second speaker; and
wherein the second processing signal is generated by inverting the first processing signal multiplied by a coefficient, which is a value calculated by dividing a transfer function of a space from the first speaker to the microphone by a transfer function of a space from the second speaker to the microphone.

14. The howling suppression device according to claim 13, wherein the sound signal generator generates the first sound signal by delaying the sound signal output from the microphone by a time required for the generation of the second processing signal by performing inversion and multiplication of the coefficient on the first processing signal.

15. The howling suppression device according to claim 13, wherein the sound signal generator generates:
the first sound signal by performing multiplication of the transfer function of the space from the second speaker to the microphone on a first signal generated by processing the sound signal output from the microphone; and
the second sound signal by performing inversion and multiplication of the transfer function of the space from the first speaker to the microphone on the first signal.

16. A howling suppression method comprising:
disposing a first speaker and a second speaker in a room;
disposing a microphone in the room, the microphone being configured to convert collected sound in the room to a sound signal and output the sound signal;
generating a first sound signal based on a first processing signal generated by processing the sound signal output from the microphone;
generating a second sound signal based on a second processing signal generated by processing the sound signal output from the microphone;
supplying the first sound signal to the first speaker;
supplying the second sound signal to the second speaker so that part or entirety of sound emitted from the first speaker is canceled out at the microphone by sound emitted from the second speaker; and
wherein the second processing signal is generated by inverting the first processing signal multiplied by a coefficient, which is a value calculated by dividing a transfer function of a space from the first speaker to the microphone by a transfer function of a space from the second speaker to the microphone.

17. The howling suppression method according to claim 16, wherein the generating of the first sound signal includes delaying the sound signal output from the microphone by a time required for the generation of the second processing signal generated by performing inversion and multiplication of the coefficient on the first processing signal.

18. The howling suppression method according to claim 16, wherein:
the generating of the first sound signal includes performing multiplication of the transfer function of the space from the second speaker to the microphone on a first signal generated by processing the sound signal output from the microphone; and
the generating of the second sound signal includes performing inversion and multiplication of the transfer function of the space from the first speaker to the microphone on the first signal.

* * * * *